US012631396B2

(12) United States Patent
Choi et al.

(10) Patent No.: US 12,631,396 B2
(45) Date of Patent: May 19, 2026

(54) DRYING APPARATUS AND SUBSTRATE TREATING APPARATUS

(71) Applicant: SEMES CO., LTD., Cheonan-si (KR)

(72) Inventors: Hae-Won Choi, Daejeon (KR); Jae Seong Lee, Hwaseong-si (KR); Hong Chan Cho, Goyang-si (KR)

(73) Assignee: SEMES CO., LTD., Cheonan-si (KR)

(*) Notice: Subject to any disclaimer, the term of this patent is extended or adjusted under 35 U.S.C. 154(b) by 599 days.

(21) Appl. No.: 18/120,981

(22) Filed: Mar. 13, 2023

(65) Prior Publication Data

US 2024/0093940 A1 Mar. 21, 2024

(30) Foreign Application Priority Data

Sep. 15, 2022 (KR) ........................ 10-2022-0116364

(51) Int. Cl.
*F26B 25/06* (2006.01)
*F26B 5/00* (2006.01)

(52) U.S. Cl.
CPC ............ *F26B 25/066* (2013.01); *F26B 5/005* (2013.01)

(58) Field of Classification Search
CPC ............................... F26B 25/066; F26B 5/005
USPC ........................................................... 34/201
See application file for complete search history.

(56) References Cited

U.S. PATENT DOCUMENTS 5,535,525 A * 7/1996 Gardner ................ F26B 21/145 134/109
6,134,807 A * 10/2000 Komino ............ H01L 21/67034 34/418
9,221,027 B2 * 12/2015 Kuppler .................... F27B 1/00
10,361,100 B2 * 7/2019 Lee ................... H01L 21/02052
11,328,925 B2 * 5/2022 Sasaki ............... H01L 21/68728
11,854,815 B2 * 12/2023 Kawabuchi ............... F26B 3/24
12,272,543 B2 * 4/2025 Choi ................. H01L 21/02057
12,334,330 B2 * 6/2025 Park .................. H01L 21/67103
2013/0145640 A1 * 6/2013 Lee .................. H01L 21/67051 34/201
2017/0084469 A1 * 3/2017 Lee ..................... H01L 21/6715
2020/0388512 A1 * 12/2020 Biwa ......................... B08B 3/04

(Continued)

FOREIGN PATENT DOCUMENTS

CN 117711971 A * 3/2024 ....... H01L 21/67051
JP 6946474 B2 * 10/2021 ............. F26B 21/10

(Continued)

OTHER PUBLICATIONS

Office Action of the Korean Intellectual Property Office dated Mar. 15, 2024.

*Primary Examiner* — Stephen M Gravini

(57) ABSTRACT

The inventive concept provides a substrate treating apparatus. The substrate treating apparatus includes a first chamber having a supply port for supplying a treating fluid; a second chamber in combination with the first chamber defining a treating space; a support member configured to support a substrate in the treating space; and a baffle unit installed in the first chamber to face the support port, and wherein the baffle unit includes: a first baffle assembly including a first baffle having first holes through which the treating fluid flow; and a second baffle assembly installed at a position farther from the support port than the first baffle assembly, and including a second baffle having second holes through which the treating fluid flow.

20 Claims, 15 Drawing Sheets

(56) References Cited

U.S. PATENT DOCUMENTS

| | | | | |
|---|---|---|---|---|
| 2022/0020609 | A1* | 1/2022 | Park | H01L 21/02101 |
| 2024/0093940 | A1* | 3/2024 | Choi | F26B 25/066 |

FOREIGN PATENT DOCUMENTS

| | | | | | |
|---|---|---|---|---|---|
| JP | 2024042637 | A | * | 3/2024 | H01L 21/67051 |
| KR | 10-2014-0132601 | | | 11/2014 | |
| KR | 10-2018-0059640 | | | 6/2018 | |
| KR | 10-2018-0125764 | | | 11/2018 | |
| KR | 10-2107256 | | | 4/2020 | |
| KR | 10-2154476 | | | 9/2020 | |
| KR | 10-2022-0054494 | | | 5/2022 | |
| KR | 10-2023-0001735 | | | 1/2023 | |
| KR | 20240037624 | A | * | 3/2024 | H01L 21/67051 |
| TW | 202414641 | A | * | 4/2024 | H01L 21/67051 |

* cited by examiner

DRYING APPARATUS AND SUBSTRATE TREATING APPARATUS

CROSS-REFERENCE TO RELATED APPLICATIONS

A claim for priority under 35 U.S.C. § 119 is made to Korean Patent Application No. 10-2022-0116364 filed on Sep. 15, 2022, in the Korean Intellectual Property Office, the entire contents of which are hereby incorporated by reference.

BACKGROUND

Embodiments of the inventive concept described herein relate to a drying apparatus and a substrate treating apparatus.

In order to manufacture a semiconductor element, a desired pattern is formed on a substrate such as a wafer through various processes such as a photolithography process, an etching process, an ashing process, an ion implantation process, and a thin film deposition process. Various treating liquids and treating gases are used for each process, and particles and process by-products are generated during the process. In order to remove these particles and process by-products from the substrate, a cleaning process is performed before and after each process.

In a general cleaning process, the substrate is liquid treated with a chemical and a rinsing liquid. In addition, it is dry treated to remove the chemical and the rinsing liquid remaining on the substrate. An embodiment of the drying process may include a rotary drying process of removing the rinsing liquid remaining on the substrate by rotating the substrate at a high speed. However, there is a concern that this rotary drying method may break down a pattern formed on the substrate.

Recently, a supercritical drying process has been used to supply an organic solvent such as an isopropyl alcohol (IPA) on the substrate to replace the rinsing liquid remaining on the substrate with an organic solvent with a low surface tension, and then to supply a supercritical drying gas (e.g., a carbon dioxide) on the substrate to remove the organic solvent remaining on the substrate. In the supercritical drying process, the drying gas is supplied to a high-pressure chamber which inside is sealed, and the drying gas is heated and pressurized. Both a temperature and a pressure of the drying gas rises above a critical point, and the drying gas phase changes to the supercritical state. The drying gas in the supercritical state has a high solubility and a permeability. In other words, if a supercritical drying gas is supplied to the substrate, the drying gas easily penetrates into the pattern on the substrate, and the organic solvent remaining on the substrate is also easily dissolved in the drying gas. Accordingly, it is possible to easily remove the organic solvent remaining between the patterns formed on the substrate.

On the other hand, in order to uniformly dry the substrate using the supercritical drying gas, it is very important to uniformly supply the supercritical drying gas to the substrate. For example, if the drying gas supplied to the substrate is concentrated and supplied in a center region of the substrate, an excessive drying may occur in the center region of the substrate, and drying of the treating liquid may not be performed completely in the edge region of the substrate. In some cases, a drying mark may occur on the substrate.

In order to uniformly supply the supercritical drying gas to the substrate, a method of forming many ports having a small diameter to be supplied with the drying gas at a high pressure chamber may be considered, but this method is not appropriate because it can increase a manufacturing cost of a high pressure chamber and may make it difficult for the drying gas to maintain the supercritical state. In addition, since the drying gas supplied to the high-pressure chamber is supplied in a high-pressure and a high-temperature state, there is a limit to reducing the diameter of the port.

SUMMARY

Embodiments of the inventive concept provide a drying apparatus and a substrate treating apparatus for efficiently treating a substrate.

Embodiments of the inventive concept provide a drying apparatus and a substrate treating apparatus for increasing a drying treatment efficiency with respect to a substrate.

Embodiments of the inventive concept provide a drying apparatus and a substrate treating apparatus for uniformly drying a substrate.

Embodiments of the inventive concept provide a drying apparatus and a substrate treating apparatus for easily changing a flow of a treating fluid supplied to a substrate.

Embodiments of the inventive concept provide a drying apparatus and a substrate treating apparatus for increasing the number of supply ports formed on a chamber or, for uniformly supplying a treating fluid to a substrate without making a diameter of a supply port smaller.

The technical objectives of the inventive concept are not limited to the above-mentioned ones, and the other unmentioned technical objects will become apparent to those skilled in the art from the following description.

The inventive concept provides a substrate treating apparatus. The substrate treating apparatus includes a first chamber having a supply port for supplying a treating fluid; a second chamber in combination with the first chamber defining a treating space; a support member configured to support a substrate in the treating space; and a baffle unit installed in the first chamber to face the supply port, and wherein the baffle unit includes: a first baffle assembly including a first baffle having first holes through which the treating fluid flow; and a second baffle assembly installed at a position farther from the support port than the first baffle assembly, and including a second baffle having second holes through which the treating fluid flow.

In an embodiment, a diameter of the first baffle is smaller than a diameter of the second baffle.

In an embodiment, the first baffle and the second baffle are installed spaced apart from each other to define a buffer space therebetween.

In an embodiment, at least a portion of the second holes do not overlap with the first holes in an ejecting direction of the treating fluid from the supply port.

In an embodiment, the first baffle assembly includes: a base plate spaced apart from the first chamber and fixed installed by a fixing means; and a plurality of the first baffles placed on the base plate.

In an embodiment, the first baffles are stacked on each other, and at least one of the first baffles has at least one mounting groove into which at least one support protrusion of the base plate is inserted.

In an embodiment, the first baffle assembly includes: a fixing ring closely contact and fixed to the first chamber; and a plurality of the stacked first baffles placed on the first ring In an embodiment, the second baffle assembly includes: a gap ring installed between the first chamber and the second baffle; and the second baffle fastened to the gap ring.

In an embodiment, an inner diameter of the first hole and an inner diameter of the second hole is different.

In an embodiment, the inner diameter of the first hole is larger than the inner diameter of the second hole.

In an embodiment, the inner diameter of the first hole is about 1 mm to about 5 mm, and the inner diameter of the second hole is about 0.5 mm to about 1 mm.

In an embodiment, the first chamber is provided with: an accommodation space in which the first baffle assembly is installed; and a buffer space between the accommodation space and the second baffle.

In an embodiment, a first sidewall of the first chamber defining the accommodation space has a first inclined angle with respect to a horizontal plane and a second sidewall of the first chamber defining the buffer space has a second inclined angle with respect to the horizontal plane, the first inclined angle being greater than the second inclined angle.

In an embodiment, a depth of the accommodation space is deeper than a depth of the buffer space.

The inventive concept provides a drying apparatus for used in drying a treating liquid remaining on a substrate. The drying apparatus includes a top chamber having a supply port for supplying the treating fluid; a bottom chamber in combination with the top chamber defining a treating space; a lifting/lowering unit configured to lift/lower any one of the top chamber or the bottom chamber; a fluid supply unit configured to supply the treating fluid to the supply port; a support member for supporting the substrate at the treating space; and a baffle unit installed in the top chamber to face the supply port, and wherein the baffle unit includes: a first baffle having first holes through which the treating fluid flow; and a second baffle spaced apart from and below the first baffle and having second holes through which the treating fluid flow, and wherein the first baffle and the second baffle define a buffer space for diffusing the treating fluid supplied by the fluid supply unit.

In an embodiment, an inner diameter of the first hole is larger than an inner diameter of the second hole.

In an embodiment, a diameter of the first baffle is larger than a diameter of the second baffle.

In an embodiment, the top chamber is provided with an accommodation space in which the first baffle is installed, the accommodation space being positioned more adjacent to the supply port than the buffer space, and a depth of the accommodation space is deeper than a depth of the buffer space, and a first sidewall of the top chamber defining the accommodation space has a first inclined angle with respect to a horizontal plane and a second sidewall of the top chamber defining the buffer space has a second inclined angle with respect to the horizontal plane, the first inclined angle being greater than the second inclined angle.

In an embodiment, a diameter of the buffer space is larger than a diameter of the accommodation space in a horizontal direction.

The inventive concept provides a substrate treating apparatus. The substrate treating apparatus includes a liquid treating apparatus for liquid treating a substrate with a treating liquid; and a drying apparatus for dry treating a substrate which has been treated at the liquid treating apparatus with a treating fluid in a supercritical state, and wherein the drying apparatus includes: a top chamber having a supply port for supplying the treating fluid; a bottom chamber in combination with the top chamber defining a treating space; a clamping unit configured to clamp the top chamber and the bottom chamber when forming the treating space by combining the top chamber and the bottom chamber; a lifting/lowering unit configured to lift/lower the bottom chamber to change a distance between the top chamber and the bottom chamber; a fluid supply unit configured to supply the treating fluid to the supply port; a support member installed in the top chamber and supporting a substrate to face the supply port; and a baffle unit installed in the top chamber to face the supply port, and wherein the top chamber is provided with: an accommodation space; and a buffer space below the accommodation space, and wherein the baffle unit includes: first baffles stacked on each other and installed in the accommodation space, each baffle having first holes; and a second baffle installed spaced apart from the first baffles and separating the buffer space and the treating space, and the second baffle having second holes and wherein a diameter of the second baffle is larger than a diameter of the first baffle.

According to an embodiment of the inventive concept, a substrate may be efficiently treated.

According to an embodiment of the inventive concept, a drying treatment efficiency may be increased with respect to a substrate.

According to an embodiment of the inventive concept, a flow of a treating fluid supplied to a substrate may be easily changed.

According to an embodiment of the inventive concept, the number of supply ports formed at a chamber may be increased, or a treating fluid may be uniformly supplied to a substrate without making a diameter of a supply port smaller.

The effects of the inventive concept are not limited to the above-mentioned ones, and the other unmentioned effects will become apparent to those skilled in the art from the following description.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
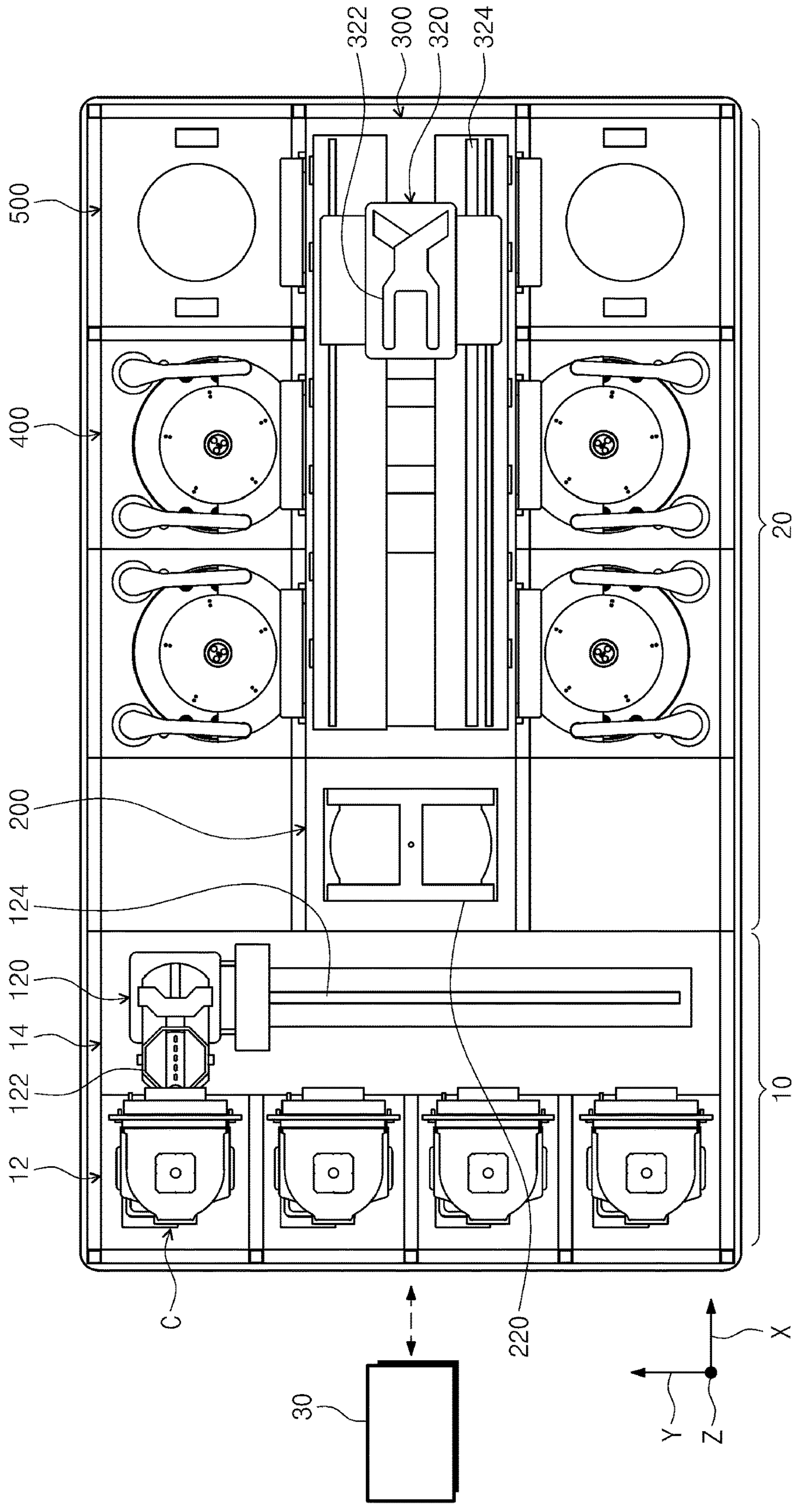
FIG. 1 is a plan view schematically illustrating a substrate treating apparatus according to an embodiment of the inventive concept.

The inventive concept may be variously modified and may have various forms, and specific embodiments thereof will be illustrated in the drawings and described in detail. However, the embodiments according to the concept of the inventive concept are not intended to limit the specific disclosed forms, and it should be understood that the present inventive concept includes all transforms, equivalents, and replacements included in the spirit and technical scope of the inventive concept. In a description of the inventive concept, a detailed description of related known technologies may be omitted when it may make the essence of the inventive concept unclear.

The terminology used herein is for the purpose of describing particular embodiments only and is not intended to be limiting of the inventive concept. As used herein, the singular forms “a”, “an” and “the” are intended to include the plural forms as well, unless the context clearly indicates otherwise. It will be further understood that the terms “comprises”, “comprising,”, “includes”, and/or “including” when used in this specification, specify the presence of stated features, integers, steps, operations, elements, and/or components, but do not preclude the presence or addition of one or more other features, integers, steps, operations, elements, components, and/or groups thereof. As used herein, the term “and/or” includes any and all combinations of one or more of the associated listed items. Also, the term “example” is intended to refer to an example or illustration.

It will be understood that, although the terms “first”, “second”, “third”, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

It should be understood that when an element or layer is referred to as being “on,” “connected to,” “coupled to,” or “covering” another element or layer, it may be directly on, connected to, coupled to, or covering the other element or layer or intervening elements or layers may be present. In contrast, when an element is referred to as being “directly on,” “directly connected to,” or “directly coupled to” another element or layer, there are no intervening elements or layers present. Other terms such as “between”, “adjacent”, “near” or the like should be interpreted in the same way.

Unless otherwise defined, all terms used herein, including technical or scientific terms, have the same meaning as those generally understood by those skilled in the art to which the inventive concept belongs. Terms such as those defined in commonly used dictionaries should be interpreted as consistent with the context of the relevant technology and not as ideal or excessively formal unless clearly defined in this application.

Hereinafter, example embodiments of the inventive concept will be described with reference to FIG. 1 to FIG. 18.

FIG. 1 is a plan view schematically illustrating a substrate treating apparatus according to an embodiment of the inventive concept.

Referring to FIG. 1, the substrate treating apparatus includes an index module 10, a treating module 20, and a controller 30. The index module 10 and the treating module 20 are disposed in a direction. Hereinafter, the direction in which the index module 10 and the treating module 20 are disposed will be referred to as a first direction X, a direction perpendicular to the first direction X will be referred to as a second direction Y, and a direction perpendicular to both the first direction X and the second direction Y will be referred to as a third direction Z.

The index module 10 transfers a substrate (for example, a wafer) from a container C in which the substrate W is stored to the treating module 20, and stores a substrate to which a treating has been completed at the treating module 20 in the container C. A lengthwise direction of the index module 10 is provided in the second direction Y. The index module 10 has a load port 12 and an index frame 14. The index frame 14 is positioned between the load port 12 and the treating module 20. The container C in which the substrates are stored is placed on the load port 12. A plurality of load ports 12 may be provided, and the plurality of load ports 12 may be disposed along the second direction Y.

For the container C, a sealed container such as a front open unified pod FOUP may be used. The container C may be placed on the load port 12 by a transfer means (not illustrated) such as an overhead transfer, an overhead conveyor, or an automatic guided vehicle or by an operator.

The index frame 14 is provided with an index robot 120. In the index frame 14, a guide rail 124 with its lengthwise direction in the second direction Y may be provided, and the index robot 120 may be provided to be movable along the guide rail 124. The index robot 120 may include a hand 122 on which the substrate W is placed, and the hand 122 may be forwardly and backwardly movable, rotatable around the third direction Z, and movable along the third direction Z. A plurality of hands 122 are provided to be spaced apart in an up/down direction, and the hands 122 may be forwardly and backwardly movable independently of each other.

The controller 30 may control the substrate treating apparatus. The controller may include a process controller e.g., a microprocessor (computer) that executes a control of the substrate treating apparatus, a user interface e.g., a keyboard in which an operator performs a command input operation or the like in order to manage the substrate treating apparatus, a display for visualizing and displaying an operation situation of the substrate treating apparatus, and the like, and a storage unit storing a control program for executing the process performed in the substrate treating apparatus under the control of the process controller, a various data and a program (i.e., treatment recipe) for executing various process in each component according to treating conditions. Further, the user interface and the storage unit may be connected to the process controller. The treatment recipe may be stored in a storage medium in the storage unit, and the storage medium may be a hard disk, and may also be a portable disk, such as a CD-ROM or a DVD, or a semiconductor memory, such as a flash memory.

The controller 30 may control configurations of the substrate treating apparatus so the substrate treating apparatus performs a liquid treating process and a drying process with respect to the substrate. For example, the controller 30 may control the index module 10 and the treating module 20 so the substrate treating apparatus performs the liquid treating process and the drying process with respect to the substrate.

The treating module 20 includes a buffer unit 200, a transfer apparatus 300, a liquid treating apparatus 400, and a drying apparatus 500.

The buffer unit 200 provides a space in which the substrate carried into the treating module 20 and the substrate carried out from the treating module 20 temporarily stay. The liquid treating apparatus 400 supplies a liquid onto the substrate W to perform a liquid treatment process of liquid treating the substrate W. The drying apparatus 500 performs a drying process of removing a liquid remaining on the substrate W. The transfer apparatus 300 transfers the substrate W between the buffer unit 200, the liquid treating apparatus 400, and the drying apparatus 500.

A lengthwise direction of the transfer apparatus 300 may be provided in the first direction X. The buffer unit 200 may be disposed between the index module 10 and the transfer apparatus 300. The liquid treating apparatus 400 and the drying apparatus 500 may be disposed on a side of the transfer apparatus 300. The liquid treating apparatus 400 and the transfer apparatus 300 may be disposed along the second direction Y. The drying apparatus 500 and the transfer apparatus 300 may be disposed along the second direction Y. The buffer unit 200 may be positioned at an end of the transfer apparatus 300.

According to an embodiment, the liquid treating apparatuses 400 may be disposed on both sides of the transfer apparatus 300, the drying apparatuses 500 may be disposed on both sides of the transfer apparatus 300, and the liquid treating apparatuses 400 may be disposed closer to the buffer unit 200 than the drying apparatuses 500. In some embodiments, at one and/or both sides of the transfer apparatus 300, the liquid treating apparatuses 400 may be provided in an array of A×B (A and B are natural numbers greater than 1 or 1) along the first direction X and the third direction Z. Also, at a side of the transfer apparatus 300, the drying apparatuses 500 may be provided in an array of C×D (C and D are natural numbers greater than 1 or 1) along the first direction X and the third direction Z. Unlike what is described, only liquid treating apparatuses 400 may be provided at a side of the transfer apparatus 300, and only drying apparatuses 500 may be provided at the other side of the transfer apparatus 300.

The transfer apparatus 300 has a transfer robot 320. In the transfer apparatus 300, a guide rail 324 with its lengthwise direction provided in the first direction X may be provided, and the transfer robot 320 may be provided to be movable on the guide rail 324. The transfer robot 320 may include a hand 322 on which the substrate W is placed, and the hand 322 may be provided to be forwardly and backwardly movable, rotatable around the third direction Z as an axis, and movable along the third direction Z. A plurality of hands 322 are provided to be spaced apart in the up/down direction, and the hands 322 may be forwardly and backwardly movable independently from each other.

The buffer unit 200 includes a plurality of buffers 220 on which the substrate W is placed. The buffers 220 may be disposed to be spaced apart from each other in the third direction Z. A front face and a rear face of the buffer unit 200 are opened. The front face is a surface facing the index module 10, and the rear face is a surface facing the transfer apparatus 300. The index robot 120 may access the buffer unit 200 through the front face, and the transfer robot 320 may access the buffer unit 200 through the rear face.

Figure 2:
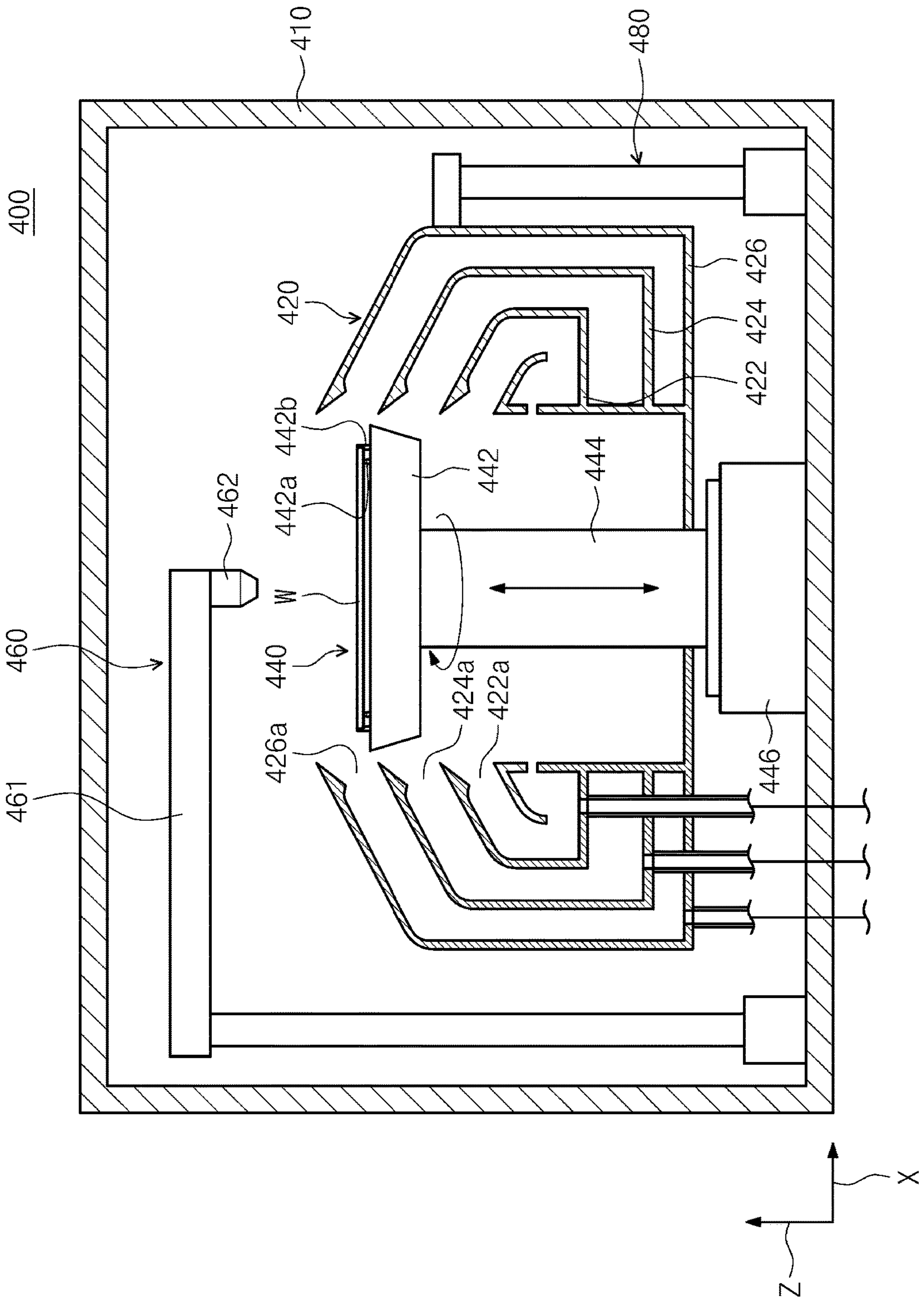
FIG. 2 schematically illustrates an embodiment of a liquid treating apparatus of FIG. 1.

FIG. 2 is a view schematically illustrating an embodiment of the liquid treating chamber of FIG. 1.

Referring to FIG. 2, the liquid treating apparatus 400 includes a housing 410, a cup 420, a support unit 440, a liquid supply unit 460, and a lifting/lowering unit 480.

The housing 410 may have an inner space in which the substrate W is treated. The housing 410 may have a generally hexahedral shape. For example, the housing 410 may have a rectangular parallelepiped shape. In addition, an opening (not shown) through which the substrate W is taken in or taken out may be formed in the housing 410. In addition, a door (not shown) for selectively opening and closing the opening may be installed in the housing 410.

The cup 420 may have a container shape with an open top. The cup 420 may have a treating space, and the substrate W may be liquid-treated in the treating space. The support unit 440 supports the substrate W in the treating space. The liquid supply unit 460 supplies the treating liquid onto the substrate W supported by the support unit 440. The treating liquid may be provided in a plurality of types and may be sequentially supplied onto the substrate W. The lifting/lowering unit 480 adjusts a relative height between the cup 420 and the support unit 440.

In an embodiment, the cup 420 has a plurality of recollecting containers 422, 424, and 426. Each of the recollecting containers 422, 424, and 426 has a recollecting space for recollecting the liquid used for substrate treatment. Each of the recollecting containers 422, 424, and 426 is provided in a ring shape surrounding the support unit 440. During a liquid treatment process, the treating liquid scattered by a rotation of the substrate W is introduced into the recollecting space through the inlets 422*a*, 424*a*, and 426*a* of each respective recollecting container 422, 424, and 426. According to an embodiment, the cup 420 has a first recollecting container 422, a second recollecting container 424, and a third recollecting container 426. The first recollecting container 422 is disposed to surround the support unit 440, the second recollecting container 424 is disposed to surround the first recollecting container 422, and the third recollecting container 426 is disposed to surround the second recollecting container 424. The second inlet 424*a* introducing the liquid into the second recollecting container 424 may be positioned above the first inlet 422*a* introducing the liquid into the first recollecting container 422, and the third inlet 426*a* introducing the liquid into the third recollecting container 426 may be positioned above the second inlet 424*a*.

The support unit 440 has a support plate 442 and a drive shaft 444. A top surface of the support plate 442 is provided in a substantially circular shape and may have a diameter larger than that of the substrate W. A support pin 442*a* is provided at a central part of the support plate 442 to support a bottom surface of the substrate W, and the support pin 442*a* is provided to protrude from the support plate 442 such that the substrate W is spaced apart from the support plate 442 by a predetermined distance. A chuck pin 442*b* is provided at an edge of the support plate 442. The chuck pin 442*b* is provided to upwardly protrude from the support plate 442, and supports a side of the substrate W so that the substrate W is stably held by the support unit 440 when the substrate W is rotated. The drive shaft 444 is driven by the driver 446, is connected to the center of the bottom surface of the substrate W, and rotates the support plate 442 based on its central axis.

According to an embodiment, the liquid supply unit 460 may include a nozzle 462. The nozzle 462 may supply the treating liquid to the substrate W. The treating liquid may be a chemical, a rinsing liquid, or an organic solvent. The chemical may be a chemical with strong acid properties or strong base properties. In addition, the rinsing liquid may be a deionized water. In addition, the organic solvent may be an isopropyl alcohol (IPA).

Also, in FIG. 2 it was described as an example that the liquid supply unit 460 has only one nozzle 462, but unlike this, the liquid supply unit 460 may include a plurality of nozzles 462, and each nozzle 462 may supply a different type of treating liquid. For example, one of the nozzles 462 may supply a chemical, another one of the nozzles 462 may supply the rinsing liquid, and still another one of the nozzles 462 may supply an organic solvent. In addition, the controller 30 may control the liquid supply unit 460 to supply the organic solvent from the still another one of the nozzles 462 to the substrate W after supplying the rinsing liquid to the substrate W from the another one of the nozzles 462. Accordingly, the rinsing liquid supplied onto the substrate W may be substituted with an organic solvent having a small surface tension.

The lifting/lowering unit 480 moves the cup 420 in the up/down direction. A relative height between the cup 420 and the substrate W is changed by the up/down vertical movement of the cup 420. As a result, the recollecting containers 422, 424, 426 for recollecting the treating liquid are changed in accordance with a type of liquid supplied to the substrate W, so that the liquids can be recollected separately. Unlike the above description, the cup 420 is fixedly installed, and the lifting/lowering unit 480 may move the support unit 440 in the up/down direction.

Referring back to FIG. 1, a substrate which liquid-treated in the liquid treating apparatus 400 may be transferred to the drying apparatus 500 by the transfer apparatus 300. A liquid film may be formed on a substrate transferred from the liquid treating apparatus 400 to the drying apparatus 500. In other words, the substrate transferred from the liquid treating apparatus 400 to the drying apparatus 500 may be brought into the drying apparatus 500 while maintaining a wetted state. The liquid film may be formed by a treating liquid supplied from the liquid treating apparatus 400. For example, a liquid film made of an organic solvent may be formed on a substrate transferred from the liquid treating apparatus 400 to the drying apparatus 500.

Figure 3:
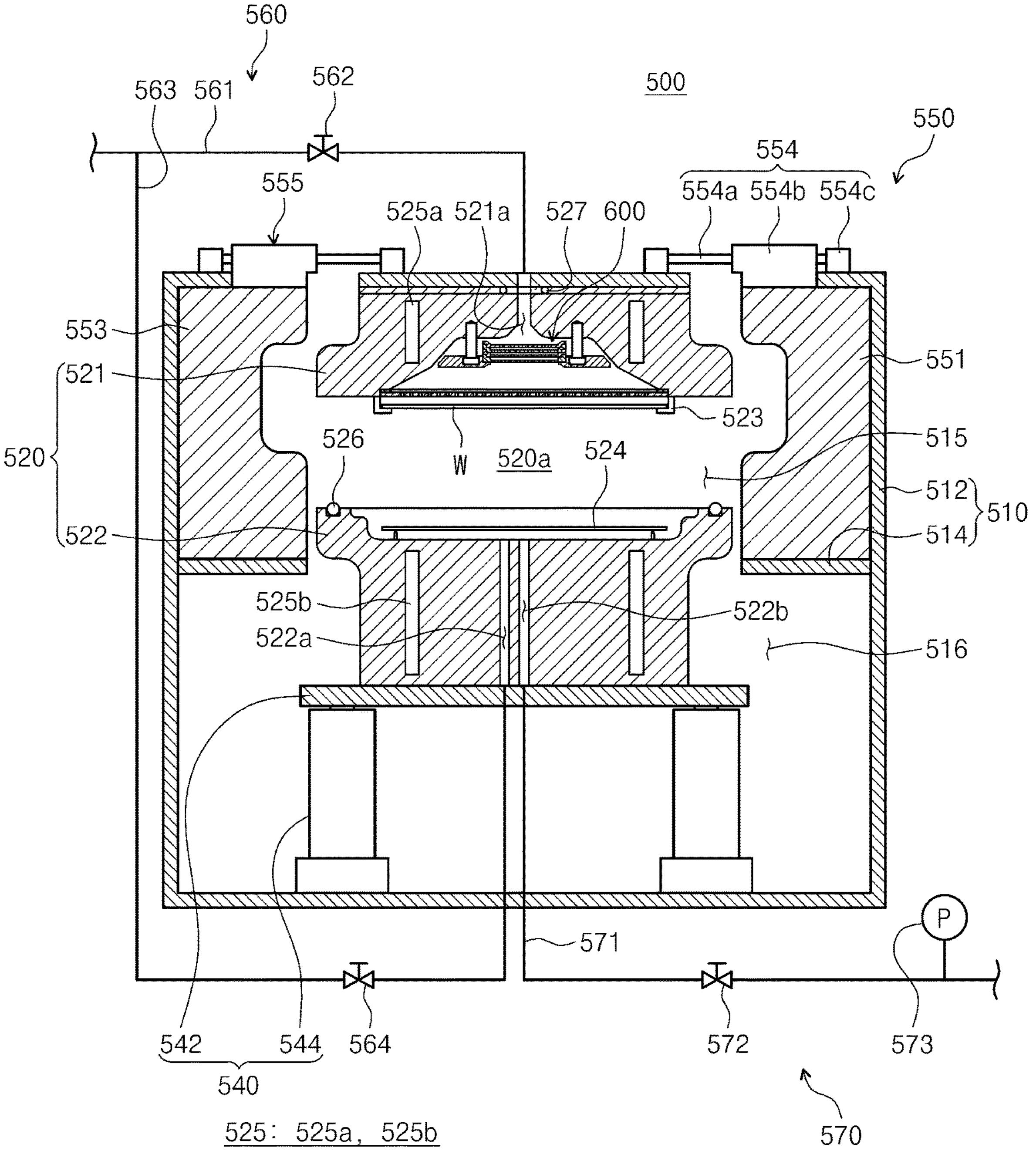
FIG. 3 schematically illustrates an embodiment of a drying apparatus of FIG. 1.
Figure 4:
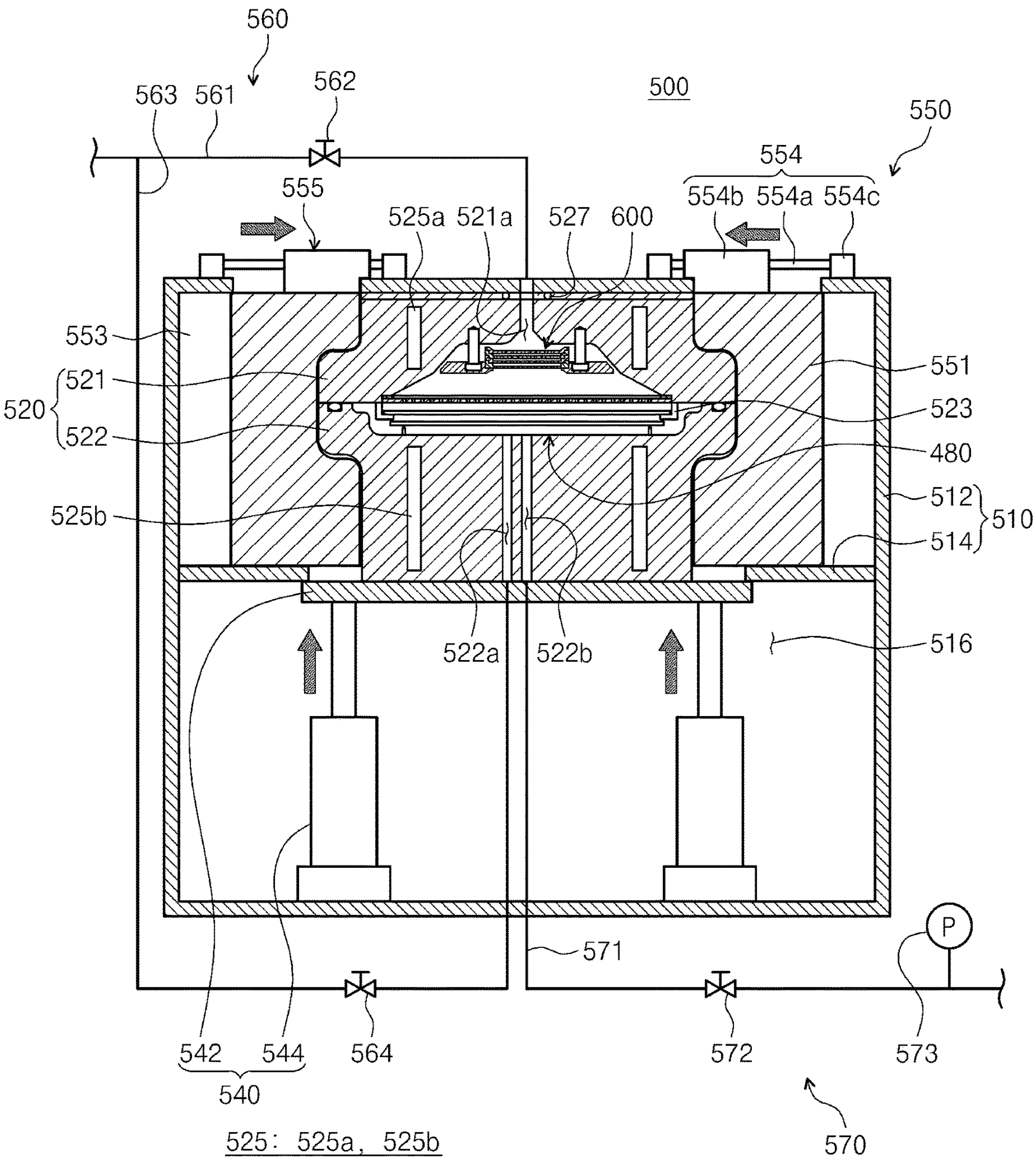
FIG. 4 illustrates a state in which a clamping unit of FIG. 3 clamps a process chamber.

FIG. 3 schematically illustrates an embodiment of the drying apparatus of FIG. 1, and FIG. 4 illustrates a state in which the clamping unit of FIG. 3 clamps the process chamber.

Referring to FIG. 3 and FIG. 4, the drying apparatus 500 may include a housing 510, a process chamber 520, a lifting/lowering unit 540, a clamping unit 550, a fluid supply unit 560, an exhaust unit 570, and a baffle unit 600.

The housing 510 may be a frame of the drying apparatus 500. The housing 510 may include a frame 512 and a middle plate 514.

The frame 512 may have a space therein. The frame 512 may have a cylindrical shape having a space therein. A first moving assembly 554 and a second moving assembly 555 of the clamping unit 550 to be described later may be installed in the frame 512.

The space having the frame 512 therein may be partitioned by the middle plate 514. The space of the frame 512 may be divided into a top space 515 and a bottom space 516 by the middle plate 514. The first clamping member 551 and the second clamping member 553 of the clamping unit 550 may be disposed in the top space 515. In addition, the top chamber 521 of the process chamber 520 may be disposed in the top space 515. A lifting/lowering plate 542 and a lifting/lowering shaft 544 of the lifting/lowering unit 540 may be disposed in the bottom space 516.

In addition, an opening may be formed in a center region of the middle plate 514. As will be described later, the bottom chamber 522 lifted and lowered by the lifting/lowering unit 540 may be moved between the top space 515 and the bottom space 516.

The process chamber 520 may define a treating space 520*a* in which the substrate W is treated. The process chamber 520 may include a top chamber 521, a bottom chamber 522, a support member 523, a blocking member 524, a heating element 525, a sealing member 526, and a buffer member 527.

The top chamber 521 may be installed above the bottom chamber 522. A position of any one of the top chamber 521 and the bottom chamber 522 is fixed, and a position of the other one of the top chamber 521 and the bottom chamber 522 may be changed. For example, the position of the top chamber 521 may be fixed, and the bottom chamber 522 may be configured to be movable in the vertical direction by the lifting/lowering unit 540.

The top chamber 521 (a first chamber) and the second chamber 522 (a second chamber) may be combined with each other to define a treating space 520*a*. For example, if the lifting/lowering unit 540, which will be described later, lifts the bottom chamber 522 upward and brings the top chamber 521 and the bottom chamber 522 into close contact with each other, the top chamber 521 and the bottom chamber 522 can be combined to define the treating space 520*a*.

A top surface of the top chamber 521 may have a stepped shape. For example, a height of a top surface center region of the top chamber 521 may be higher than a height of a top surface edge region. A lower surface of the bottom chamber 522 may have a stepped shape. For example, a height of the bottom surface center region of the bottom chamber 522 may be lower than a height of a bottom edge region.

A top surface center region of the bottom chamber 522 may be indented in a direction from a top to a bottom. The region indented in the bottom chamber 522 may define the treating space 520*a* described above if the top chamber 521 and the bottom chamber 522 are combined with each other.

Each of the top chamber 521 and the bottom chamber 522 may be made of a metal material.

A top supply port 521*a* for supplying the treating fluid supplied by the fluid supply unit 560 to the substrate W may be formed in the top chamber 521. The top supply port 521*a* may be formed to face a top surface of the substrate W supported by the support member 523 to be described later. The top supply port 521*a* may be formed in a center of the top chamber 521 when viewed from above. A top part of the top supply port 521*a* may have a constant diameter, and a bottom part of the top supply port 521*a* may have a shape having a diameter which gradually increases from a top to a bottom.

The bottom chamber 522 may have a bottom supply port 522*a* which supplies the treating fluid supplied by the fluid supply unit 560 to the treating space 520*a*, and an exhaust port 522*b* which exhausts the treating fluid supplied to the treating space 520*a* to the outside.

The exhaust port 522*b* may be formed in a center of the bottom chamber 522 when viewed from the bottom chamber 522 from a bottom side. The bottom supply port 522*a* may be formed at a position eccentric to the center of the bottom chamber 522 when viewed from the bottom chamber 522 from the bottom side.

The support member 523 may support the substrate W. The support member 523 may be configured to support an edge region of the substrate W. The support member 523 may be installed in the top chamber 521. The support member 523 may be installed under the top chamber 521. The support member 523 may have a ring shape but may include a mounting protrusion extending in a direction toward a center of the support member 523. In some embodiments, the support member 523 may include a plate of a ring shape and at least one mounting protrusion protruding from an upper surface of the plate. A bottom surface of the edge region of the substrate W may be placed on the mounting protrusion of the support member 523.

The blocking member 524 may be installed to face the bottom supply port 522*a* formed at the bottom chamber 522 to be described later. The blocking member 524 may include a plate portion having a plate shape and a plurality of legs installed under the plate portion. The blocking member 524 is installed to face the bottom supply port 522*a* to primarily block the treating fluid supplied by the bottom supply port 522*a*. Accordingly, the treating fluid supplied by the bottom supply port 522*a* is not concentrated and supplied to a bottom surface center region of the substrate W, but may be spread relatively uniformly in the treating space 520*a* and then may be transferred to the substrate W.

The heating element 525 may be installed in the top chamber 521 and the bottom chamber 522. The heating element 525 may be embedded within the top chamber 521 and the bottom chamber 522. The heating element 525 may include a first heating element 525*a* and a second heating element 525*b*. The first heating element 525*a* may be installed in the top chamber 521, and the second heating element 525*b* may be installed in the bottom chamber 522. A plurality of first heating elements 525*a* and a plurality of second heating elements 525*b* may be embedded within the top chamber 521 and the bottom chamber 522. The plurality of first heating elements 525*a* may be buried along a circumferential direction when viewed from the top side of the top chamber 521. The plurality of second heating elements 525*b* may be buried along the circumferential direction when viewed from the top side of the bottom chamber 522.

The heating element 525 may be a heater. The heating element 525 may adjust a temperature of the treating space 520*a* to a temperature at which the treating fluid may maintain a supercritical state.

The sealing member 526 may seal the treating space 520*a* formed by the top chamber 521 and the bottom chamber 522. The sealing member 526 may be installed in a groove formed in the bottom chamber 522. The sealing member 526 may have a ring shape. The sealing member 526 may be formed of an elastic material. The sealing member 526 may be formed of a rubber or an elastic engineering plastic material. After the top chamber 521 is in close contact with the bottom chamber 522, if the treating fluid is supplied to the treating space 520*a* and a pressure of the treating space 520*a* increases, a force may be applied to the top chamber 521 and the bottom chamber 522 in a direction away from each other by a pressure of the treating space 520*a*. The sealing member 526 can seal the treating space 520*a* even if the top chamber 521 and the bottom chamber 522 are not completely in close contact with each other because of this pressure.

The buffer member 527 may reduce a vibration which may occur in the top chamber 521 if the bottom chamber 522 is in close contact with the top chamber 521. The buffer member 527 may be installed in the top chamber 521. The buffer member 527 may be formed of an elastic material. The buffer member 527 may be a leaf spring or a coil spring.

The lifting/lowering unit 540 may lift/lower any one of the bottom chamber 522 and the top chamber 521. The lifting/lowering unit 540 can adjust a relative distance between the bottom chamber 522 and the top chamber 521 by moving any one of the bottom chamber 522 or the top chamber 521. For example, the lifting/lowering unit 540 may lift and lower the bottom chamber 522 and closely contact the top chamber 521. The lifting/lowering unit 540 may move the bottom chamber 522 in an upward direction to combine the top chamber 521 and the bottom chamber 522. The top chamber 521 and the bottom chamber 522 may be combined with each other to form the above-described treating space 520*a*.

The lifting/lowering unit 540 may include a lifting/lowering plate 542 and a lifting/lowering shaft 544. A bottom chamber 522 may be installed on a top of the lifting/lowering plate 542. A plurality of lifting/lowering shafts 544 may be installed under the lifting/lowering plate 542. The lifting/lowering shaft 544 may be elongated by a driver which is not shown. For example, the lifting/lowering shaft 544 may be a cylinder which length may be elongated in the vertical direction by a pneumatic pressure or a hydraulic pressure.

The clamping unit 550 may clamp the process chamber 520. If a pressure of the treating space 520*a* increases, a gap between the top chamber 521 and the bottom chamber 522 may be widened, and the clamping unit 550 may minimize a distance between the top chamber 521 and the bottom chamber 522 from becoming excessively far, even if the pressure of the treating space 520*a* increases.

The clamping unit 550 may include a first clamping member 551, a second clamping member 553, a first moving assembly 554, and a second moving assembly 555. The first clamping member 551 and the second clamping member 553 may be installed at positions facing each other. An inner shape of the first clamping member 551 and the second clamping member 553 may have a shape corresponding to an outer shape of the process chamber 520. For example, a side of the process chamber 520 in which the top chamber 521 and the bottom chamber 522 are combined may be clamped by an inside of the first clamping member 551, and the other side of the process chamber 520 may be clamped by an inside of the second clamping member 552.

The first moving assembly 554 and the second moving assembly 555 may have a structure symmetrical to each other. The first moving assembly 554 may include a guide rail 554*a*, a bracket 554*b*, and a driver 554*c*. The guide rail 554*a* may be positioned outside the housing 510, and the guide rail 554*a* may be installed above the top chamber 521 and the frame 512. The bracket 554*b* may be configured to be movable along the guide rail 554*a*. The bracket 554*b* may be connected to the first clamping member 551. That is, if the driver 554*c* changes a position of the bracket 554*b* along the guide rail 554*a*, a position of the first clamping member 551 connected to the bracket 554*b* may be changed in the horizontal direction.

Similarly, a position of the second clamping member 553 may be changed in the horizontal direction by the second moving assembly 555.

The clamping unit 550 may clamp the top chamber 521 and the bottom chamber 522 by moving the first clamping member 551 and the second clamping member 553 in the horizontal direction if the lifting/lowering unit 540 closely contacts the bottom chamber 522 with the top chamber 521.

The fluid supply unit 560 may supply the treating fluid to the treating space 520*a*. The treating fluid may be supplied to the treating space 520*a* in a supercritical state, or may be converted from a gaseous state to a supercritical state in the treating space 520*a*. The treating fluid may be a gas containing a carbon dioxide ($CO_2$).

The fluid supply unit 560 may include a top supply line 561, a top valve 562, a bottom supply line 563, and a bottom valve 564. The top supply line 561 may receive a treating fluid from a fluid supply source (not shown) and supply the treating fluid to the top supply port 521*a*. The bottom supply line 563 may receive the treating fluid from the fluid supply source and supply the treating fluid to the bottom supply port 522*a*. A top valve 562, which is an on/off valve, may be installed on the top supply line 561, and a bottom valve 564, which is an on/off valve, may be installed on the bottom supply line 563.

In addition, at least one heater may be installed on the top supply line 561 and the bottom supply line 563, although not shown, to increase a temperature of the treating fluid supplied to the treating space 520*a*.

The exhaust unit 570 may exhaust the treating fluid supplied to the treating space 520*a* to the outside. The exhaust unit 570 may include an exhaust line 571 connected to the exhaust port 522*b*, an exhaust valve 572 installed in the exhaust line 571, and a depressurizer 573 providing a depressurization. The exhaust valve 572 may be an on/off valve. The depressurizer 573 may be a pump.

A pressure of the treating space 520*a* may be adjusted by supplying the treating fluid to the treating space 520*a* by the fluid supply unit 560 and by exhausting the treating fluid from the treating space 520*a*.

The baffle unit 600 may allow the treating fluid supplied from the top supply port 521*a* to be uniformly supplied to the substrate W. The baffle unit 600 may be installed in the top chamber 521. The baffle unit 600 may be installed above the substrate W placed on the support member 523. The baffle unit 600 may be installed in the top chamber 521 to face the top supply port 521*a*.

Figure 5:
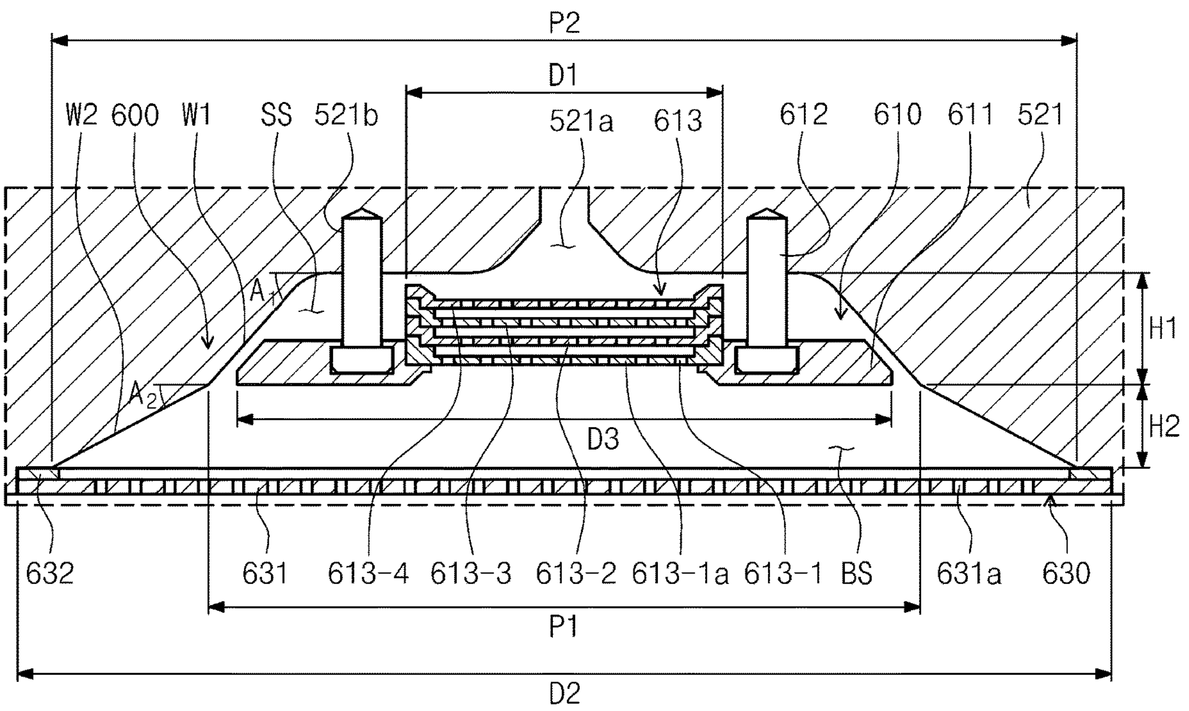
FIG. 5 illustrates a baffle unit according to a first embodiment of the inventive concept.

FIG. 5 illustrates the baffle unit according to a first embodiment of the inventive concept.

Referring to FIG. 3 and FIG. 5, the baffle unit 600 may be installed in the top chamber 521 to face the top supply port 521*a*.

First, an accommodation space SS and a buffer space BS may be formed in the top chamber 521. The accommodation space SS may be a space facing the top supply port 521*a*. The buffer space BS may be a space positioned below the accommodation space SS. The buffer space BS and the treating space 520*a* may be divided by a second baffle 631 of the baffle unit 600 to be described later. The buffer space BS and the accommodation space SS may have a generally conical shape in which a top portion is cut.

Among the surfaces of the top chamber 521 defining the accommodation space SS, a first inner wall W1 equivalent to a side surface may form a first inclined angle A1 with respect to a horizontal plane. The first inclined angle A1 may mean a smaller angle among two angles formed by the first inner wall W1 with respect to the horizontal plane.

The second inner wall W2, which is a side surface of the top chamber 521 defining the buffer space BS, may form a second inclined angle A2 with respect to the horizontal plane. The second inclined angle A2 may mean a smaller angle among two angles formed by the second inner wall W2 with respect to the horizontal plane.

The first inclined angle A1 may be different from the second inclined angle A2. For example, the first inclined angle A1 may be an angle greater than the second inclined angle A2. In short, the first inner wall W1 may have a steeper angle than the second inner wall W2.

In addition, a diameter of the accommodation space SS may increase as it goes downward. In addition, a diameter of the buffer space BS may increase as it goes downward. In addition, if the accommodation space SS and the buffer space BS are viewed from the top side toward the substrate W supported by the support member 523, the diameter of the buffer space BS may be larger than the accommodation space SS. For example, a largest diameter P1 of the diameters of the accommodation space SS may be smaller than a largest diameter P2 of the diameters of the buffer space BS. In addition, a first depth H1 of the accommodation space SS may be deeper than a second depth H2 of the buffer space BS. In short, the accommodation space SS may have a depth deeper than that of the buffer space BS and an inclined angle steeper than that of the buffer space BS.

The baffle unit 600 may include a first baffle assembly 610 and a second baffle assembly 630. The first baffle assembly 610 may be installed at a position directly facing the top supply port 521*a*. The second baffle assembly 630 may be installed at a position lower than the first baffle assembly 610, that is, at a position far from the top supply port 521*a*.

The first baffle assembly 610 may include a base plate 611, a fixing means 612, and first baffles 613.

Figure 6:
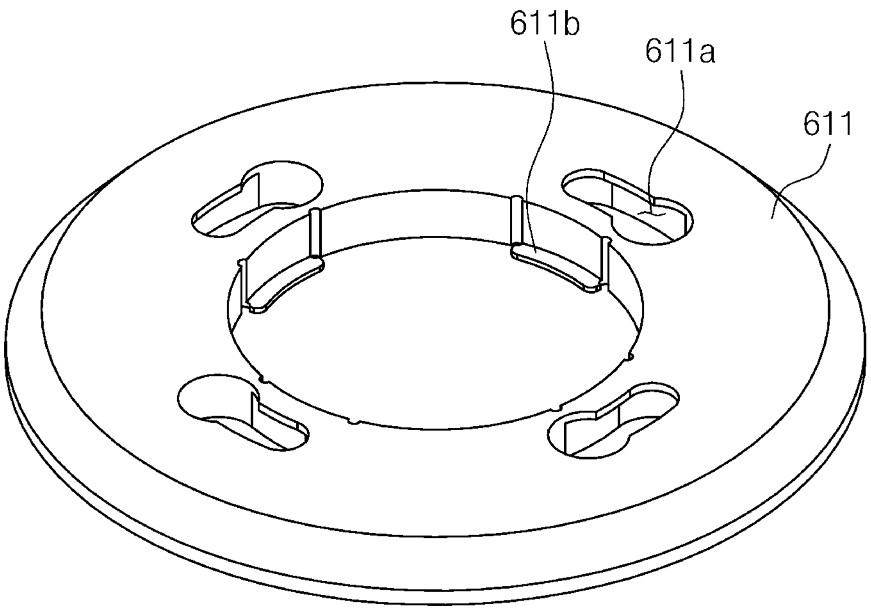
FIG. 6 illustrates a base plate of FIG. 5 as viewed from above.
Figure 7:
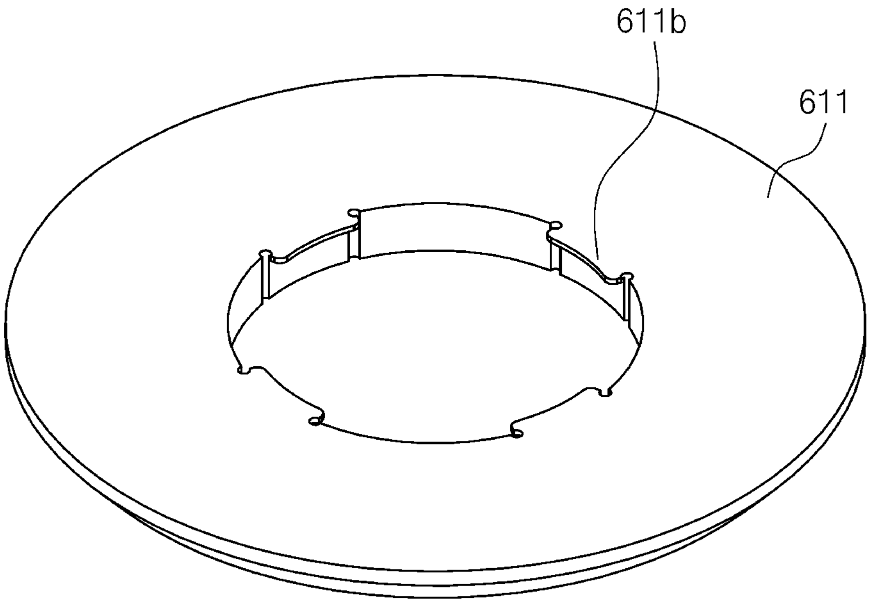
FIG. 7 illustrates the base plate of FIG. 5 as viewed from below.

FIG. 6 illustrates a base plate of FIG. 5 as viewed from above, and FIG. 7 illustrates the base plate of FIG. 5 as viewed from below.

Referring to FIG. 5, FIG. 6, and FIG. 7, the base plate 611 can have a generally donut shape with an opening formed at the center. The base plate 611 may have a substantially ring shape. At the top surface of the base plate 611, insertion grooves 611*a* into which the fixing means 612 is inserted may be formed. In some embodiments, the fixing means may include or may be a rod with a head (i.e., a head bolt) or a screw with a head (i.e., a head screw). For example, the head of the rod or screw may be inserted into the insertion groove 611*a* of the base plate 611. A plurality of insertion grooves 611*a* may be formed to be spaced apart from each other in the circumferential direction. The insertion groove 611*a* may include an insertion part into which a head of the fixing means 612 is inserted, and a locking part which extends from the insertion part and at which the head of the fixing means 612 hangs on. In addition, a support protrusion 611*b* for supporting the first baffle 613 may be formed on an inner circumference of the base plate 611. A plurality of support protrusions 611*b* may be formed on the base plate 611, and the support protrusion s 611*b* may be formed on the base plate 611 to be spaced apart from each other in the circumferential direction.

The base plate 611 may be fixedly installed in the top chamber 521. For example, the base plate 611 may be fixed to the top chamber 521 by a fixing means 612. The base plate 611 may be fixed to be spaced apart from the top chamber 521 by the fixing means 612. A head part of the fixing means 612 may be fixed to the insertion groove 611*a* formed in the base plate 611, and a body part of the fixing means 612 may be inserted into a fastening groove 521*b* formed in the top chamber 521. The fixing means 612 may be welded to and fixed to the fastening groove 521*b*. However, this is not limited to this, and threads are formed in the fastening groove 521*b*, and the fixing means 612 may be fixed to the fastening groove 521*b* in a screwed manner.

Figure 8:
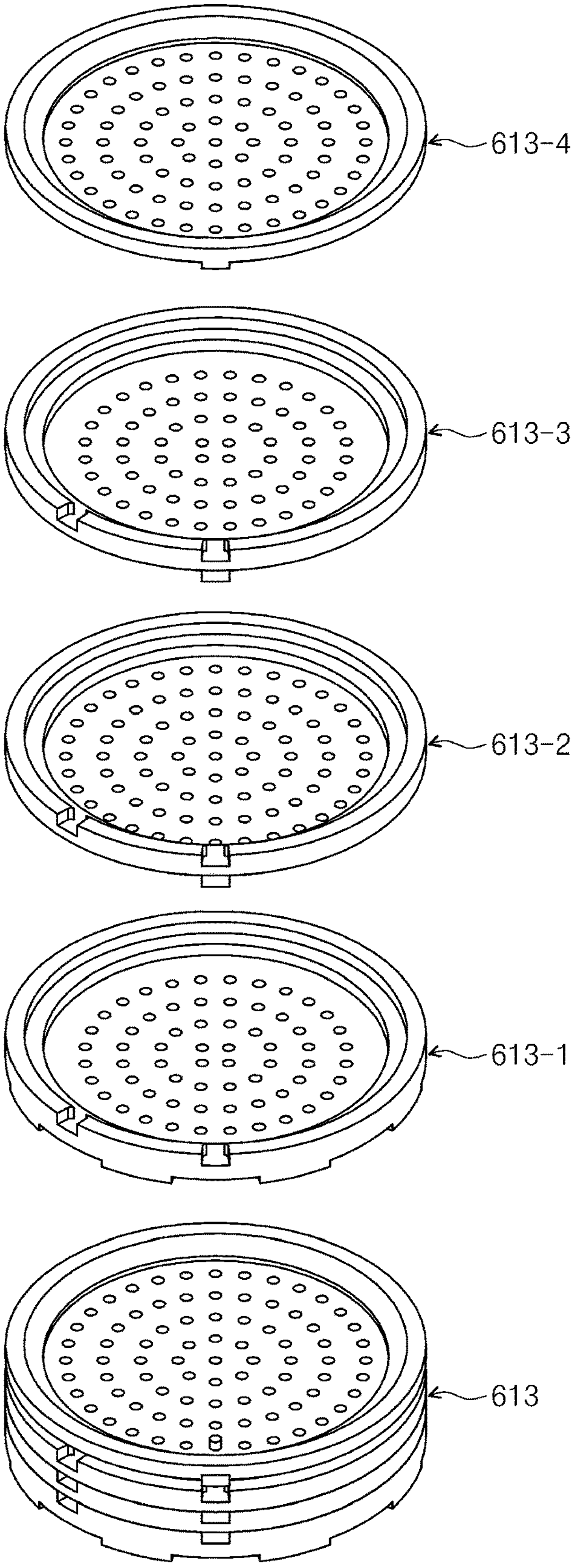
FIG. 8 illustrates a state in which the first baffles of FIG. 5 are stacked as viewed from above.
Figure 9:
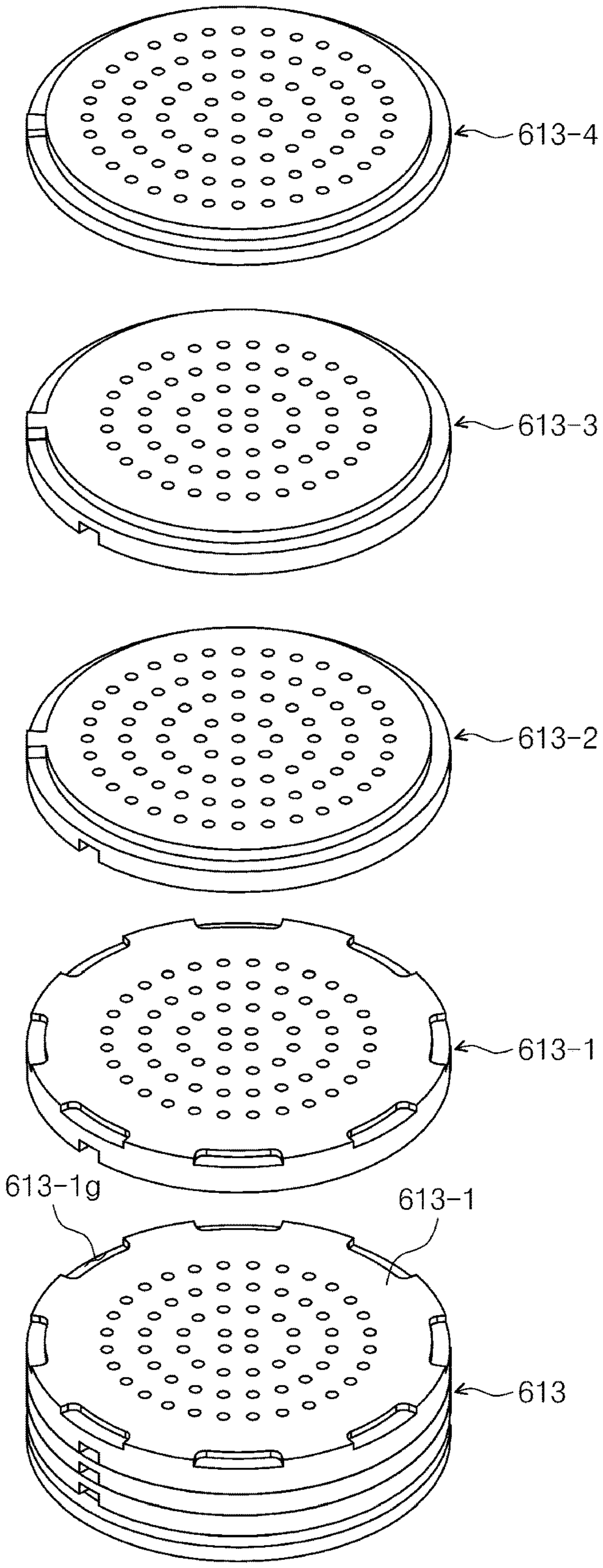
FIG. 9 illustrates a state in which the first baffles FIG. 5 are stacked as viewed from below.
Figure 10:
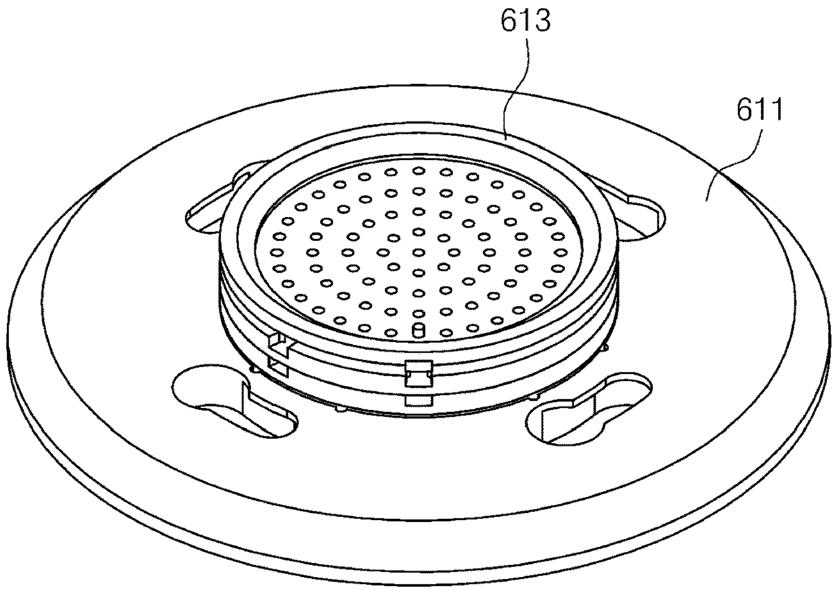
FIG. 10 illustrates a state in which the first baffles are placed on the base plate as viewed from above.
Figure 11:
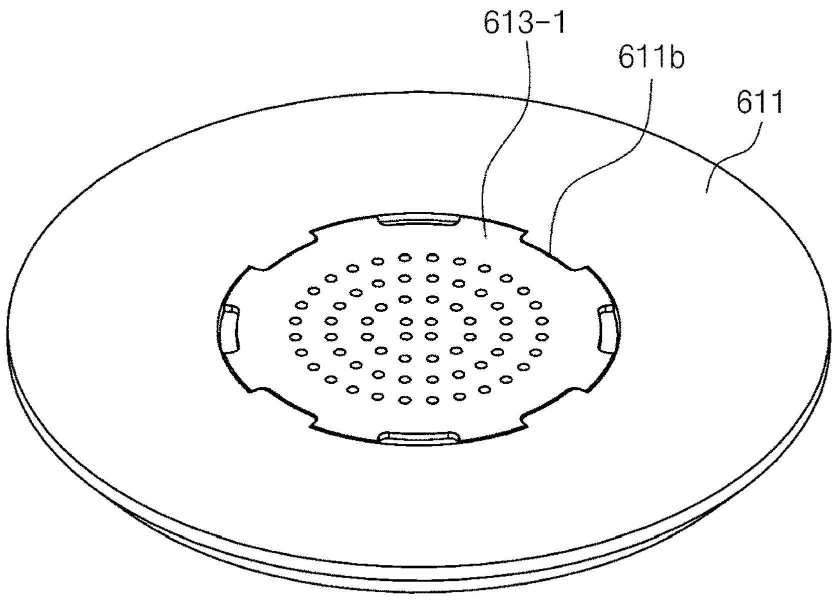
FIG. 11 illustrates a state in which the first baffles are placed on the base plate as viewed from the below.

FIG. 8 illustrates the first baffles of FIG. 5 and a state in which the first baffles are stacked as viewed from above, FIG. 9 illustrates the first baffles of FIG. 5 and a state in which the first baffles are stacked as viewed from below, FIG. 10 illustrates a state in which the first baffles are placed on the base plate as viewed from above, and FIG. 11 illustrates a state in which the first baffles are placed on the base plate as viewed from the below.

Referring to FIG. 5 and FIG. 8 to FIG. 11, the first baffle assembly 610 may include a plurality of first baffles 613. For example, the first baffle assembly 610 may include a 1-1 baffle 613-1, a 1-2 baffle 613-2, a 1-3 baffle 613-3, and a 1-4 baffle 613-4. The 1-1 baffle 613-1, the 1-2 baffle 613-2, the 1-3 baffle 613-3, and the 1-4 baffle 613-4 may be referred to as the first baffle 613 in the inventive concept specification otherwise specified. The first baffle 613 may be a perforated plate having first holes 613*a* formed therein. In some embodiments, the first holes 613*a* may have the same diameter or at least one hole of the first holes 613*a* may be different from the other holes in diameter. The first baffles 613 may have a structure which may be stacked. The 1-1 baffle 613-1, the 1-2 baffle 613-2, the 1-3 baffle 613-3, and the 1-4 baffles 613-4 may be stacked in order from a bottom to a top. The stacked first baffles 613 may be placed on the base plate 611.

A mounting groove 613-1*g* into which the support protrusion 611*b* of the base plate 611 is inserted may be formed on the bottom surface of the 1-1 baffle 613-1 positioned at the bottom of the first baffle 613. A plurality of mounting grooves 613-1*g* may be formed, and may be formed to be spaced apart from each other in the circumferential direction of the base plate 611. The number of mounting grooves 613-1*g* may be greater than the number of supporting protrusions 611*b*. Accordingly, it becomes easier for the operator to mount the stacked first baffles 613 on the base plate 611.

Referring back to FIG. 5, the second baffle assembly 630 may include a second baffle 631 and a gap ring 632. The second baffle 631 may be a perforated plate in which a plurality of second holes 631*a* are formed. The second baffle 631 may divide the buffer space BS and the treating space 520*a* from each other. The second baffle 631 may be installed below the buffer space BS and above the treating space 520*a*.

The second baffle 631 may be fixedly installed in the top chamber 521. The gap ring 632 may be installed between the second baffle 631 and the top chamber 521. The gap ring 632 may have a ring shape. The gap ring 632 may be a ring-shaped plate having a predetermined thickness. A specific interval may be secured between the first baffle 613 and the second baffle 631 through the gap ring 632.

In addition, a plurality of gap rings 632 having a different thicknesses may be provided. Accordingly, the operator may change the process conditions by adjusting the interval between the first baffle 613 and the second baffle 631 by replacing and installing the gap ring 632 according to the type of substrate W to be treated or the processing conditions required for the substrate W.

In addition, an inner diameter of the first hole 613*a* of the first baffle 613 and an inner diameter of the second hole 631*a* of the second baffle 631 may be the same, or an inner diameter of the first hole 613*a* may be smaller than an inner diameter of the second hole 631*a*. For example, the first hole 613*a* may have an inner diameter of about 1 mm to about 5 mm, and the second hole 631*a* may have an inner diameter of about 0.5 mm to about 1 mm.

In addition, a diameter D1 of the first baffle 613 may be smaller than a diameter D2 of the second baffle 631. In addition, a diameter D3 of the base plate 611 may be larger than the diameter D1 of the first baffle 613, and may be smaller than the diameter D2 of the second baffle 631.

In addition, when the first baffles 613 are seen from a top side, the first holes 613*a* formed in one of the first baffles 613 and the other of the first baffles 613 adjacent thereto may be formed so as not to overlap each other. For example, the first holes 613*a* formed in the 1-1 baffle 613-1 and the first holes 613*a* formed in the 1-2 baffle 613-2 may be formed not to overlap each other when seen from above.

Figure 12:
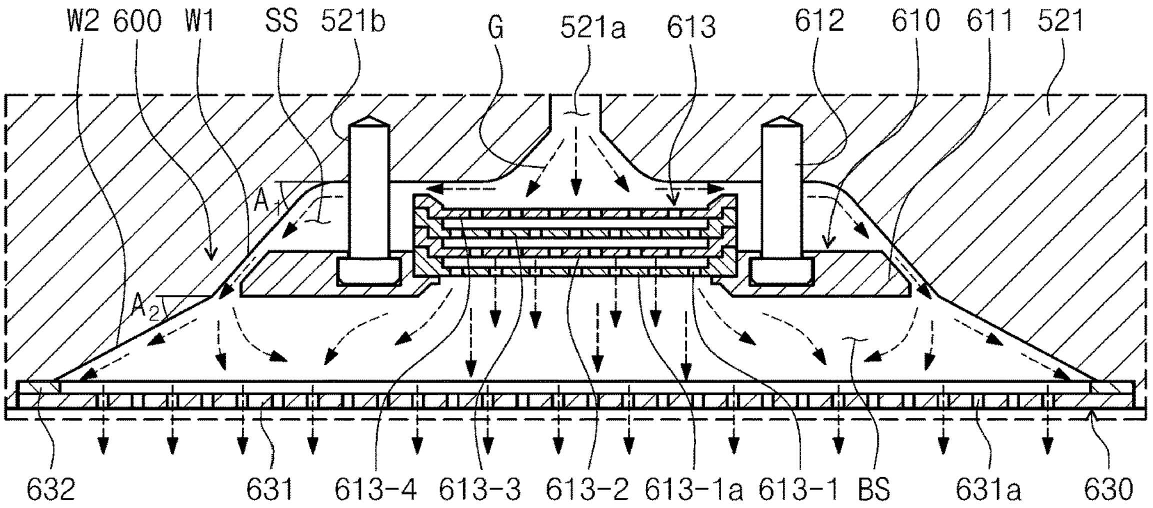
FIG. 12 illustrates a flow of a treating fluid in the drying apparatus having a baffle unit according to a first embodiment of the inventive concept.

FIG. 12 illustrates a flow of a treating fluid in a drying apparatus having a baffle unit according to a first embodiment of the inventive concept.

Referring to FIG. 3, FIG. 5, and FIG. 12, if the drying apparatus 500 is provided with the baffle unit 600 according to the first embodiment of the inventive concept, the treating fluid G supplied through the top supply port 521*a* is primarily blocked through the first baffle assembly 610. The treating fluids G primarily blocked through the first baffle assembly 610 may flow into the buffer space BS through the first holes 613*a* formed in the first baffles 613, or may flow into the buffer space BS after flowing into the space between the base plate 611 and the top chamber 521. The treating fluids G introduced into the buffer space BS having a relatively large diameter may be diffused to a wide range in the buffer space BS and then may be transferred to the substrate W through the second holes 631*a* formed in the second baffle 631.

Also, as described above, the inner diameter of the first hole 613*a* may be larger than the inner diameter of the second hole 631*a*. If the inner diameter of the first hole 613*a* is relatively small, the first baffles 613 may be deformed because of an excessive pressure by the treating fluid G supplied through the top supply port 521*a*. In addition, if the inner diameter of the second hole 631*a* is relatively large, the treating fluid G may not be uniformly supplied to the substrate W. Accordingly, according to an embodiment of the inventive concept, the inner diameter of the first hole 613*a* can be made larger than the inner diameter of the second hole 631*a*, so solve a problem of an excessive pressure being applied to the first baffle 613 and a problem of the treating fluid G not being uniformly supplied to the substrate W can be resolved.

Also, as described above, the diameter D2 of the buffer space BS may be greater than the diameter D1 of the accommodation space SS. If the treating fluid G passing through the accommodation space SS in which the first baffle assembly 610 is installed flows into the buffer space BS having a relatively large diameter, a flow rate of the treating fluid G may be slowed. If the flow rate of the treating fluid G is slowed, the treating fluid G is not immediately supplied to the substrate W, but the treating fluid G is first uniformly diffused in the buffer space BS and then supplied to the substrate W, so that the treating fluid can be supplied relatively uniformly to the substrate W.

Figure 13:
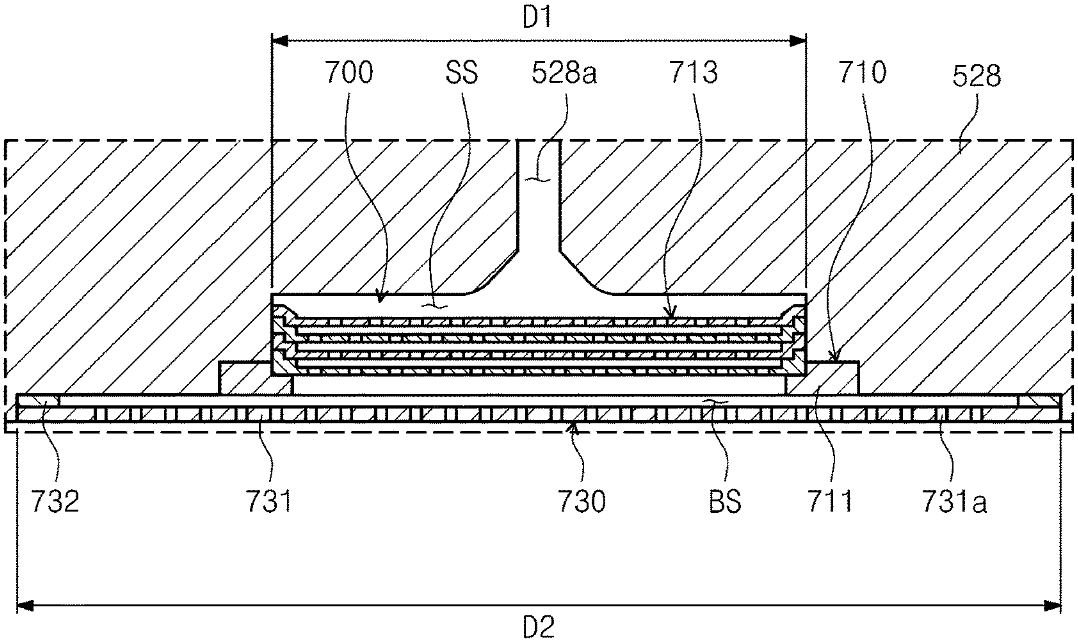
FIG. 13 illustrates the baffle unit according to a second embodiment of the inventive concept.
Figure 14:
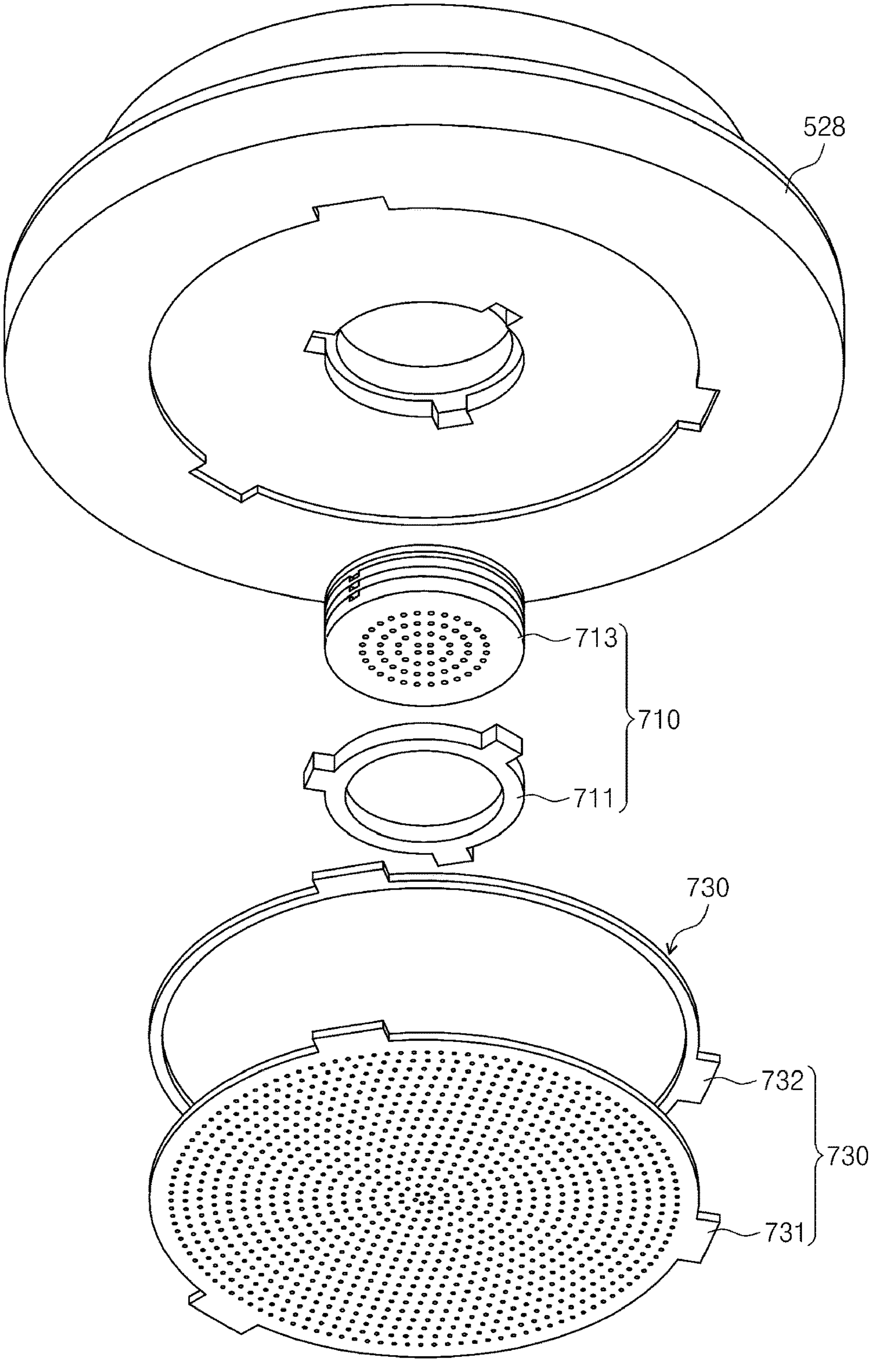
FIG. 14 is a schematic exploded perspective view of the baffle unit and a top chamber of FIG. 13.

FIG. 13 illustrates the baffle unit according to a second embodiment of the inventive concept, and FIG. 14 is a schematic exploded perspective view of the baffle unit and a top chamber of FIG. 13.

The drying apparatus 500 may be equipped with a baffle unit 700 in accordance with the second embodiment described below, instead of the baffle unit 600 in accordance with the first embodiment. In addition, the above-described drying apparatus 500 may include a top chamber 528 instead of the top chamber 521 described above. Since other configurations of the drying apparatus 500 are the same/similar to those of the above-described embodiment, a repeated description thereof will be omitted.

Referring to FIG. 3, FIG. 13, and FIG. 14, the baffle unit 700 according to the second embodiment of the inventive concept may include a first baffle assembly 710 and a second baffle assembly 730.

The accommodation space SS and the buffer space BS may be formed in the top chamber 528. The first baffle assembly 710 may be installed in the accommodation space SS. The buffer space BS may be positioned below the accommodation space SS. The treating space 520*a* formed by the buffer space BS and the process chamber 520 may be partitioned by the second baffle 731 of the second baffle assembly 730.

The first baffle assembly 710 may include a fixing ring 711 and first baffles 713. A plurality of first baffles 713 stacked on each other may be placed on the fixing ring 711. The fixing ring 711 on which the plurality of first baffles 713 are placed may be inserted into the accommodation space SS of the top chamber 528 and fixed by a fixing means (such as a bolt or screw) which is not shown. The first holes 713*a* may be formed in the first baffles 713. The first holes 713*a* may have the same shape and the same inner diameter as the first holes 613*a* described above.

The second baffle assembly 730 may be installed below the second baffle assembly 710. The second baffle assembly 730 may include a second baffle 731 and a gap ring 732. The second baffle 731 and the gap ring 732 may be fixedly installed in the top chamber 528. For example, the second baffle 731 may be fixedly installed in the top chamber 528, and the gap ring 732 may be positioned between the second baffle 731 and the top chamber 528.

The second holes 731*a* may be formed in the second baffle 731. The second holes 731*a* may have the same shape and the same inner diameter as the second holes 613*a* described above. The second baffle 731 may be spaced apart from the first baffle 713 positioned at the bottom of the plurality of first baffles 713 by the gap ring 732 and the fixing ring 711.

In addition, a diameter D1 of the first baffle 713 may be smaller than a diameter D2 of the second baffle 731. For example, the diameter D1 of the first baffle 713 may be about 50 mm to about 150 mm. For example, the diameter D1 of the first baffle 713 may be about 100 mm or about 150 mm.

Figure 15:
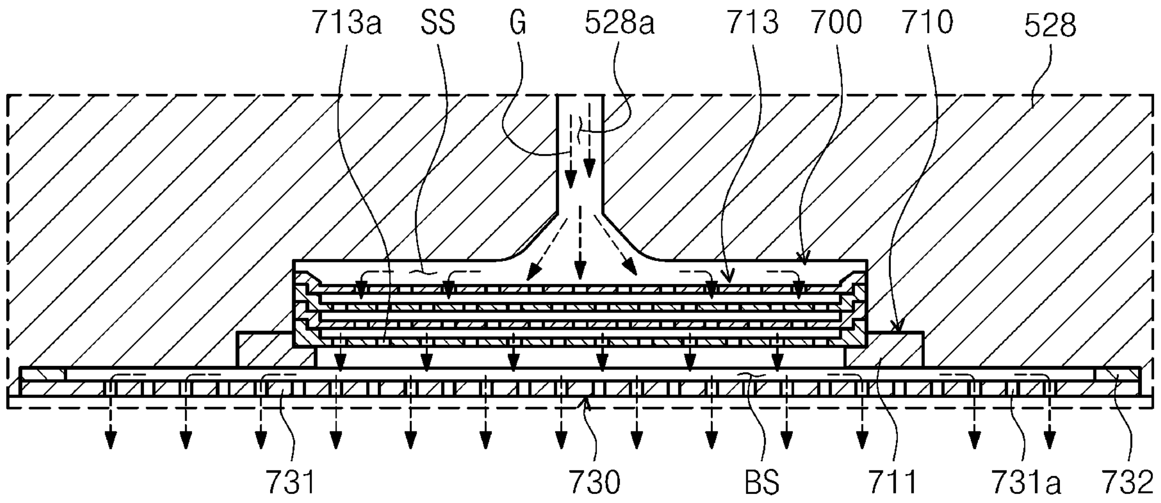
FIG. 15 illustrates the flow of the treating fluid in the drying apparatus having the baffle unit according to a second embodiment of the inventive concept.

FIG. 15 illustrates the flow of the treating fluid in the drying apparatus having the baffle unit according to a second embodiment of the inventive concept.

Referring to FIG. 13 and FIG. 15, the treating fluid G supplied from the top supply port 528*a* of the top chamber 528 may be primarily blocked by the first baffles 713 of the first baffle assembly 710 and then spread to a space between the first baffle 713 and the second baffle 731 of the buffer space BS through the first holes 713*a* formed at the first baffle 713. In this case, since the buffer space BS has a diameter larger than that of the first baffle 713, the diffusion of the treating fluid G in the buffer space BS may be more smoothly performed. The treating fluids G diffused in the buffer space BS may be supplied to the substrate W relatively uniformly.

Figure 16:
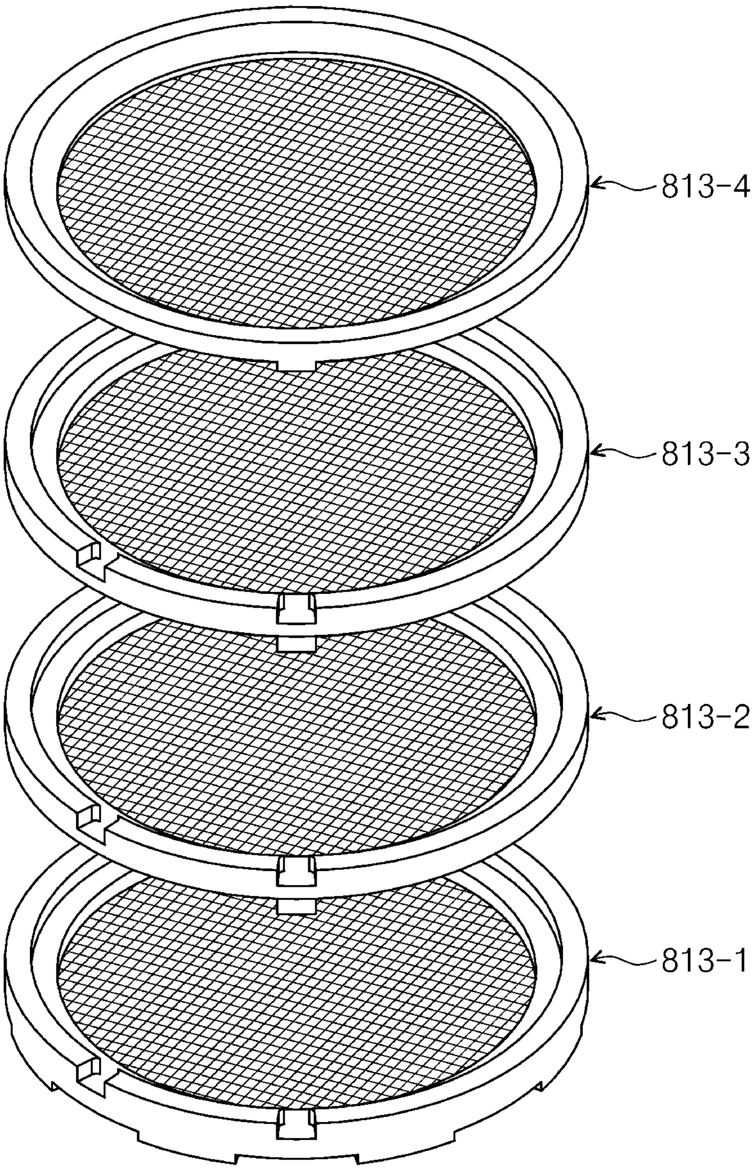
FIG. 16 illustrates another embodiment of the first baffles.
Figure 17:
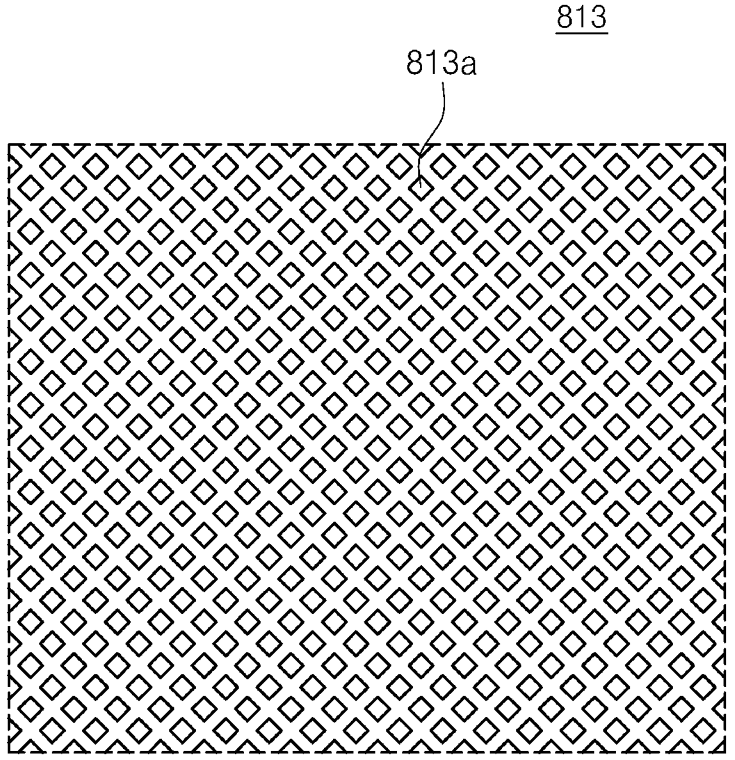
FIG. 17 is an enlarged view of a portion of any one of the first baffles of FIG. 16.

FIG. 16 illustrates another embodiment of the first baffles, and FIG. 17 is an enlarged view of a portion of any one of the first baffles of FIG. 16.

In the above-described example, the first baffles 613 and 713 are described as examples of the perforated plates, but the inventive concept is not limited thereto. For example, as shown in FIG. 16 and FIG. 17, the first baffles 813 may be configured such that a plurality of first baffles 813-1, 813-2, 813-3, and 813-4 may be stacked on each other, and may be provided as a porous plate. In this case, the first baffles 813 may be manufactured by a 3D printing method instead of a method of forming a hole in a disk-shaped plate. A porosity by the first holes 813*a* formed in the first baffles 813 may be variously adjusted by the user in accordance with the processing conditions required for the substrate W.

Figure 18:
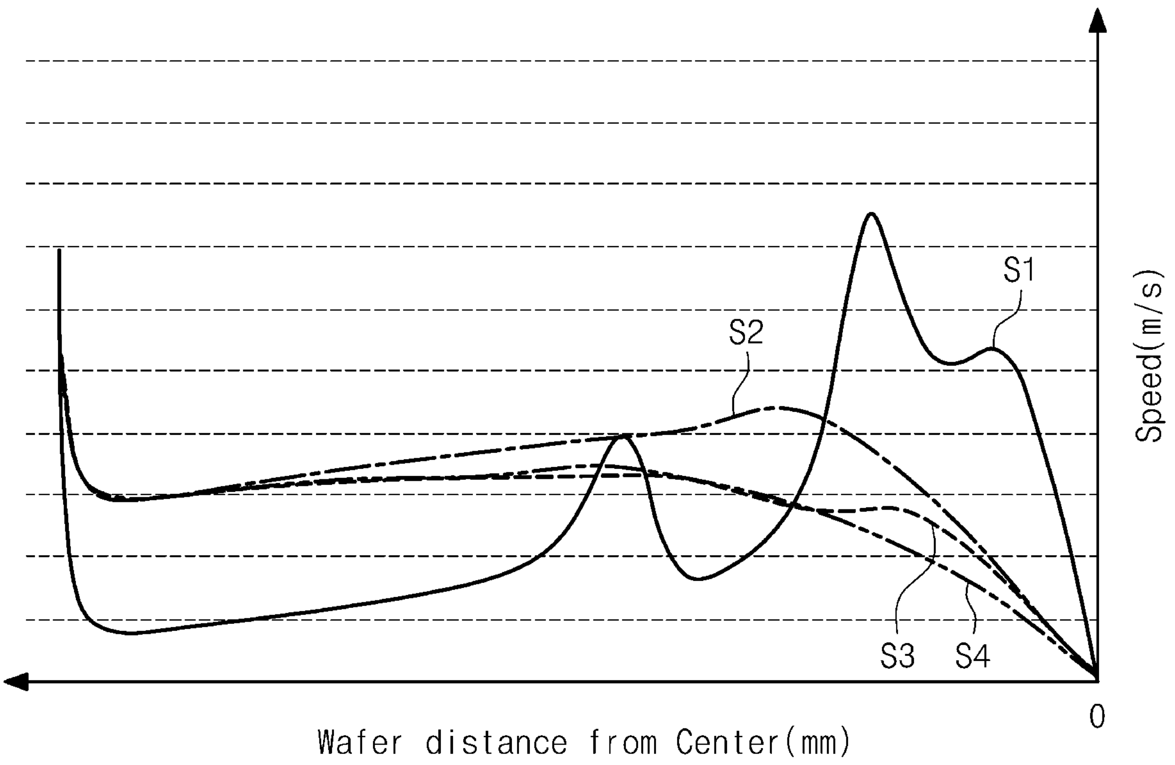
FIG. 18 is a graph showing a flow rate of the treating fluid according to a distance from a center of a substrate, in a case in which the baffle unit is installed according to an embodiment of the inventive concept and in a case in which it is not.

FIG. 18 is a graph showing a flow rate of the treating fluid according to a distance from a center of a substrate, in a case in which the baffle unit is installed according to an embodiment of the inventive concept and in a case in which it is not.

In FIG. 18, S1 is a graph showing a flow rate of the treating fluid according to a distance from a center of the substrate if the baffle units 600 and 700 of the inventive concept are not used, S2 is a graph showing the flow rate of the treating fluid according to a distance from the center of the substrate if the baffle unit 700 of the second embodiment of the inventive concept is used and the diameter D1 of the first baffle 713 is 100 mm, S3 is a graph showing the flow rate of the treating fluid according to a distance from the center of the substrate if the baffle unit 700 is used and the diameter D1 of the first baffle 713 is 150 mm, and S4 is a graph showing the flow rate of the treating fluid according to a distance from the center of the substrate if the baffle unit 700 of the second embodiment of the inventive concept is used and the diameter D1 of the first baffle 713 is 150 mm. The flow rate of the treating fluid may be the flow rate of the treating fluid flowing above the substrate W. S1 may be a comparative example in which only the first baffle assembly 610 is used and the second baffle assembly 630 is not used, especially in the baffle unit 600 according to the first embodiment.

As shown in FIG. 18, when the baffle units 600 and 700 of the inventive concept are not used (i.e., if a double baffle assembly structure is not used), the flow rate of the treating fluid according to the distance from the center of the substrate is very uneven. On the other hand, if the baffle units 600 and 700 according to the embodiment of the inventive concept are used, it can be seen that the flow rate of the treating fluid according to the distance from the center of the substrate is very uniformly changed. That is, the inventive concept uses the double baffle assembly structure to allow the treating fluid to be transferred relatively uniformly to the substrate, thereby uniformly drying the substrate.

The effects of the inventive concept are not limited to the above-mentioned effects, and the unmentioned effects can be clearly understood by those skilled in the art to which the inventive concept pertains from the specification and the accompanying drawings.

Although the preferred embodiment of the inventive concept has been illustrated and described until now, the inventive concept is not limited to the above-described specific embodiment, and it is noted that an ordinary person in the art, to which the inventive concept pertains, may be variously carry out the inventive concept without departing from the essence of the inventive concept claimed in the claims and the modifications should not be construed separately from the technical spirit or prospect of the inventive concept.

What is claimed is:

1. A substrate treating apparatus comprising:
a first chamber having a supply port for supplying a treating fluid;
a second chamber coupled to the first chamber, wherein the first chamber and the second chamber are coupled with each other to define a treating space;
a support member configured to support a substrate in the treating space; and
a baffle unit installed in the first chamber to face the supply port of the first chamber, and
wherein the baffle unit includes:
a first baffle assembly including a first baffle having first holes through which the treating fluid flows; and
a second baffle assembly installed at a position farther from the supply port of the first chamber than the first baffle assembly, and including a second baffle having second holes through which the treating fluid flows.

2. The substrate treating apparatus of claim 1,
wherein a diameter of the first baffle is smaller than a diameter of the second baffle.

3. The substrate treating apparatus of claim 2,
wherein the first baffle and the second baffle are installed spaced apart from each other to define a buffer space therebetween.

4. The substrate treating apparatus of claim 1,
wherein at least a portion of the second holes do not overlap the first holes in an ejecting direction of the treating fluid from the supply port.

5. The substrate treating apparatus of claim 1,
wherein the first baffle assembly comprises:
a base plate spaced apart from a lower surface of the first chamber;
a fixing means connecting the base plate to the first chamber; and
a plurality of baffles placed on the base plate, and
wherein the plurality of baffles include the first baffle.

6. The substrate treating apparatus of claim 5,
wherein the plurality of baffles are stacked on each other, and
wherein the base plate includes at least one support protrusion protruding from an inner surface of the base plate, and
wherein at least one baffle of the plurality of baffles includes at least one mounting groove into which the at least one support protrusion of the base plate is inserted.

7. The substrate treating apparatus of claim 1,
wherein the first baffle assembly comprises:
a fixing ring fixed to the first chamber; and
a plurality of baffles placed on the fixing ring, and
wherein the plurality of baffles include the first baffle.

8. The substrate treating apparatus of claim 1,
wherein the second baffle assembly comprises:
a gap ring installed between the first chamber and the second baffle, and
wherein the second baffle is fastened to the gap ring.

9. The substrate treating apparatus of claim 1,
wherein an inner diameter of each of the first holes is different from an inner diameter of each of the second holes.

10. The substrate treating apparatus of claim 9,
wherein the inner diameter of each of the first holes is larger than the inner diameter of each of the second holes.

11. The substrate treating apparatus of claim 1,
wherein the first holes include a hole with a diameter selected from a range of about 1 mm to about 5 mm, and
wherein the second holes include a hole with a diameter selected from a range of about 0.5 mm to about 1 mm.

12. The substrate treating apparatus of claim 1,
wherein the first chamber includes:
an accommodation space in which the first baffle assembly is installed; and
a buffer space between a lower surface of the first baffle assembly and an upper surface of the second baffle.

13. The substrate treating apparatus of claim 12,
wherein the first chamber further includes:
a first lower surface defining the accommodation space and having a first inclined angle with respect to a horizontal plane; and
a second lower surface defining the buffer space and having a second inclined angle with respect to the horizontal plane, and wherein the first inclined angle is greater than the second inclined angle.

14. The substrate treating apparatus of claim 12,
wherein a depth of the accommodation space is deeper than a depth of the buffer space.

15. A drying apparatus for used in drying a substrate with a treating fluid remaining thereon, the drying apparatus comprising:
a top chamber having a supply port for supplying the treating fluid;
a bottom chamber coupled to the top chamber, wherein the top chamber and the bottom chamber are coupled with each other to define a treating space;
a lifting/lowering unit configured to lift/lower any one of the top chamber and the bottom chamber;
a fluid supply unit configured to supply the treating fluid to the supply port;
a support member for supporting the substrate in the treating space; and
a baffle unit installed in the top chamber to face the supply port of the top chamber, and
wherein the baffle unit includes:
a first baffle having first holes through which the treating fluid flows; and
a second baffle spaced apart from and below the first baffle and having second holes through which the treating fluid flows, and
wherein the first baffle and the second baffle define a buffer space for diffusing the treating fluid supplied by the fluid supply unit.

16. The drying apparatus of claim 15,
wherein an inner diameter of each of the first holes is larger than an inner diameter of each of the second holes.

17. The drying apparatus of claim 15,
wherein a diameter of the first baffle is larger than a diameter of the second baffle.

18. The drying apparatus of claim 15,
wherein the top chamber includes:
an accommodation space in which the first baffle is installed, the accommodation space being positioned more adjacent to the supply port than the buffer space, and a depth of the accommodation space being deeper than a depth of the buffer space;
a first lower surface defining the accommodation space and having a first inclined angle with respect to a horizontal plane; and
a second lower surface defining the buffer space and having a second inclined angle with respect to the horizontal plane, and wherein the first inclined angle is greater than the second inclined angle.

19. The drying apparatus of claim 18, wherein a diameter of the buffer space is larger than a diameter of the accommodation space in a horizonal direction.

20. A substrate treating apparatus comprising:

a liquid treating apparatus for liquid treating a substrate with a treating liquid; and a drying apparatus for dry treating the substrate which has been treated at the liquid treating apparatus with a treating fluid in a supercritical state, and wherein the drying apparatus comprises:

a top chamber having a supply port for supplying the treating fluid;

a bottom chamber in combination with the top chamber defining a treating space;

a clamping unit configured to clamp the top chamber and the bottom chamber when forming the treating space by combining the top chamber and the bottom chamber;

a lifting/lowering unit configured to lift/lower the bottom chamber to change a distance between the top chamber and the bottom chamber;

a fluid supply unit configured to supply the treating fluid to the supply port;

a support member installed in the top chamber and supporting the substrate to face the supply port; and a baffle unit installed in the top chamber to face the support member, and wherein the top chamber is provided with:

an accommodation space; and a buffer space below the accommodation space, and wherein the baffle unit comprises:

first baffles stacked on each other and installed in the accommodation space, each baffle having first holes; and a second baffle installed spaced apart from the first baffles and separating the buffer space and the treating space, and the second baffle having second holes and wherein a diameter of the second baffle is larger than a diameter of one of the first baffles.

* * * * *